US012797163B2

(12) United States Patent
Aparicio et al.

(10) Patent No.: US 12,797,163 B2
(45) Date of Patent: Nov. 17, 2026

(54) ASYMMETRIC ZYGOMATIC DENTAL IMPLANT WITH PARTIAL MICRO THREAD/GROOVE

(71) Applicant: Southern Implants (PTY) Ltd, Irene (ZA)

(72) Inventors: Carlos Aparicio, Irene (ZA); Graham Alan Blackbeard, Irene (ZA); Richard Graham Pauck, Irene (ZA)

(73) Assignee: Southern Implants (PTY) Ltd, Irene (ZA)

( * ) Notice: Subject to any disclaimer, the term of this patent is extended or adjusted under 35 U.S.C. 154(b) by 168 days.

(21) Appl. No.: 18/736,200

(22) Filed: Jun. 6, 2024

(65) Prior Publication Data

US 2024/0325122 A1 Oct. 3, 2024

Related U.S. Application Data

(63) Continuation of application No. 17/693,796, filed on Mar. 14, 2022, now Pat. No. 12,004,920, which is a (Continued)

(51) Int. Cl.
*A61C 8/00* (2006.01)

(52) U.S. Cl.
CPC .......... *A61C 8/0034* (2013.01); *A61C 8/0022* (2013.01); *A61C 8/0025* (2013.01); (Continued)

(58) Field of Classification Search
CPC ... A61C 8/0034; A61C 8/0018; A61C 8/0022; A61C 8/0025; A61C 8/0037; A61C 8/0056; A61C 8/0074; A61C 8/0089
See application file for complete search history.

(56) References Cited

U.S. PATENT DOCUMENTS

| | | |
|---|---|---|
| 5,362,236 A | 11/1994 | Branemark |
| 5,564,926 A | 10/1996 | Branemark |

(Continued)

FOREIGN PATENT DOCUMENTS

| | | |
|---|---|---|
| BR | MU8 700 304 U2 | 4/2019 |
| CN | 1088420 A | 6/1994 |

(Continued)

OTHER PUBLICATIONS

Stolyarov, V. V. et al., "Microstructure and properties of pure Ti processed by ECAP and cold extrusion," Materials Science and Engineering A303 (2001), pp. 82-89 (8 pages).

(Continued)

*Primary Examiner* — Nicholas D Lucchesi
(74) *Attorney, Agent, or Firm* — Nixon Peabody LLP

(57) ABSTRACT

A zygomatic dental implant includes a generally cylindrical body, an interior threaded bore, and an asymmetrical external feature. The generally cylindrical body has a coronal portion and an apical portion. The generally cylindrical body has a main-central axis. The interior threaded bore is formed in the coronal portion of the generally cylindrical body for receiving a screw configured to removably hold an abutment in engagement with the zygomatic dental implant. The interior threaded bore has a bore-central axis. The asymmetrical external feature is on at least a portion of a first side of the generally cylindrical body such that the asymmetrical external feature is configured to directly engage alveolar bone of the patient. The asymmetrical external feature includes a plurality of circumferentially extending grooves.

28 Claims, 16 Drawing Sheets

Related U.S. Application Data continuation of application No. 16/279,632, filed on Feb. 19, 2019, now Pat. No. 11,278,379.

(60) Provisional application No. 62/633,481, filed on Feb. 21, 2018.

(52) U.S. Cl.
CPC .......... *A61C 8/0037* (2013.01); *A61C 8/0056* (2013.01); *A61C 8/0074* (2013.01); *A61C 8/0089* (2013.01)

(56) References Cited

U.S. PATENT DOCUMENTS

| | | | | |
|---|---|---|---|---|
| 5,573,401 | A | 11/1996 | Davidson | |
| 7,866,981 | B2 * | 1/2011 | Brajnovic | A61C 8/0034 433/173 |
| 9,125,708 | B2 | 9/2015 | Carvalho | |
| 10,820,969 | B2 | 11/2020 | Carvalho | |
| 11,813,139 | B2 * | 11/2023 | Thomé | A61C 8/0071 |
| 11,992,387 | B2 * | 5/2024 | Afflitto | A61C 8/0034 |
| 2008/0234675 | A1 | 9/2008 | Ohrnell | |
| 2009/0239197 | A1 | 9/2009 | Brajnovic | |
| 2010/0129774 | A1 | 5/2010 | Martinez | |
| 2011/0027756 | A1 | 2/2011 | Benatouil | |
| 2011/0183291 | A1 | 7/2011 | Carvalho | |
| 2012/0077151 | A1 | 3/2012 | Nary Filho | |
| 2012/0178048 | A1 | 7/2012 | Cottrell | |
| 2012/0236247 | A1 | 9/2012 | Yuan et al. | |
| 2012/0264085 | A1 | 10/2012 | Hansson | |
| 2014/0087331 | A1 | 3/2014 | Hildmann | |
| 2014/0272794 | A1 | 9/2014 | Legum | |
| 2015/0230890 | A1 | 8/2015 | Carvalho | |
| 2016/0015483 | A1 | 1/2016 | Kumar | |
| 2017/0252130 | A1 | 9/2017 | Blackbeard | |
| 2017/0281320 | A1 | 10/2017 | Blackbeard | |
| 2017/0354485 | A1 | 12/2017 | Chu | |
| 2018/0193115 | A1 | 7/2018 | Weitzel | |
| 2018/0263735 | A1 | 9/2018 | Carvalho | |
| 2019/0231489 | A1 | 8/2019 | Blackbeard | |
| 2021/0137648 | A1 | 5/2021 | Carvalho | |
| 2022/0008171 | A1 | 1/2022 | Tschopp | |
| 2022/0133444 | A1 * | 5/2022 | Thomé | A61C 8/0034 433/174 |

FOREIGN PATENT DOCUMENTS

| | | | |
|---|---|---|---|
| CN | 201727594 | U | 2/2011 |
| WO | WO 2008/157137 | A1 | 12/2008 |
| WO | WO 2010/003433 | A1 | 1/2010 |
| WO | WO 2012/007118 | A1 | 1/2012 |
| WO | WO 2012/164560 | A1 | 12/2012 |
| WO | WO 2013/008962 | A1 | 1/2013 |
| WO | WO 2015/162612 | A1 | 10/2015 |
| WO | WO 2016/033642 | A1 | 3/2016 |

OTHER PUBLICATIONS

Southern Implants, "Cranio Facial Reconstruction Manual," published Feb. 2011 (6 pages).
Southern Implants, "Narrow-Apex Zygomatic Implant," published Feb. 2017 (2 pages).
International Search Report and Written Opinion in International Application No. PCT/IB2019/051344, mailed May 15, 2019 (5 pages).

* cited by examiner

ASYMMETRIC ZYGOMATIC DENTAL IMPLANT WITH PARTIAL MICRO THREAD/GROOVE

CROSS-REFERENCE TO RELATED APPLICATIONS

This application is a continuation of U.S. patent application Ser. No. 17/693,796, filed Mar. 14, 2022, now allowed, which is a continuation of U.S. patent application Ser. No. 16/279,632, filed Feb. 19, 2019, now issued as U.S. Pat. No. 11,278,379, which claims the benefit of and priority to U.S. Provisional Application No. 62/633,481, filed Feb. 21, 2018, which is hereby incorporated by reference herein in their entireties. This application is related to U.S. patent application Ser. No. 15/446,132, filed Mar. 1, 2017, now issued as U.S. Pat. No. 10,292,793, which is hereby incorporated by reference herein in its entirety.

TECHNICAL FIELD

This disclosure relates to restorative dental implants and more specifically to zygomatic dental implants with an asymmetrical external feature.

BACKGROUND

Single tooth restorations (e.g., crowns) present the unique requirement that they must be supported non-rotationally on an underlying structure (e.g., a natural tooth prep, an abutment/implant assembly, etc.). When the underlying structure is a prepared natural tooth, this non-rotational supporting requirement is met in the normal course of preparing the natural tooth with a non-circular cross-section. Similarly, when the underlying structure is an abutment secured to a dental implant, this non-rotational supporting requirement is met by preparing and/or using an abutment with a noncircular cross-section. This latter scenario can be more complicated due to the added connection between the dental implant and the abutment.

Typically, a dental implant is implanted into bone of a patient's jaw (e.g., maxilla and/or mandible). While numerous design iterations have been marketed, overall there have been two types of dental implant-abutment interfaces within these assemblies: (i) an external-connection dental implant and (ii) an internal-connection dental implant. The external-connection dental implant design typically includes a hexagonal boss (or another anti-rotation feature) protruding out of the dental implant's upper surface, whereas the internal-connection dental implant design typically includes a hexagonal socket (or another anti-rotation feature) extending down and into the dental implant's upper portion. With either dental implant (e.g., external/boss or internal/socket), a corresponding abutment engages the dental implant in a non-rotational fashion and is typically secured thereto with a screw engaging an internal threaded bore.

In most restorative situations, a central or main axis of the tooth restoration and/or of the post of the abutment is at a non-zero angle relative to the central or main axis of the dental implant. This is typically the case due to the natural anatomy of most patients. As such, when installed, natural forces (e.g., from chewing) generated in the mouth are transferred from the tooth restoration (e.g., crown), to the abutment, and then to the dental implant installed in the patient's jawbone. Because of the angle between the central axis of the tooth restoration and the central axis dental implant, the forces also create bending moments that can cause the abutment and dental implant to separate, which can allow leakage into the dental implant.

One solution to mitigating the negative impact of such forces on the connection site between the abutment and the dental implant involves the use of angled dental implants. Angled dental implants typically include an angled mating surface (e.g., angled relative to horizontal) for connection with the abutment and an angled threaded bore (e.g., angled relative to vertical) for receiving the screw that holds the abutment to the dental implant at an angle relative to a central or main axis of the dental implant. While such angled dental implants aid in mitigating the negative impact of the natural forces at the connection site (between the abutment and the dental implant), the inclusion of such internal angled features within the dental implant generally requires the dental implant to have a relatively larger sized outer diameter to accommodate such angled features therein. More specifically, the inclusion of such internal angled features can cause a portion or portions of an outer wall of the angled dental implant to have thickness that is much thinner than the rest of the wall forming the angled dental implant. As such, if the outer diameter of the dental implant is too small (even if just at a relatively small portion of the angled dental implant), the angled dental abutment may be prone to easily break/snap/fail. Due to these limitations, angled dental implants have typically been limited to having at least a 4.5 millimeter outer diameter; however, such angled dental implants are not typically suitable for use in the anterior maxilla/mandible as the anterior maxilla/mandible in many patients is not able to support dental implants with such a large outer diameter.

Further, because of the anatomy of the skull, the back of the upper jaw has less bone than the lower jaw. Tooth loss in some patient can lead to a loss of bone as well. Once the teeth are gone, bone begins to be resorbed (absorbed back into the body). If teeth have been missing for a long time, there often is not enough bone left in the mouth of a patient to install implants. In some cases, a sinus augmentation is done when there is not enough bone height in the upper jaw, or the sinuses are too close to the jaw. Many people who have lost teeth in their upper jaw—particularly the back teeth, or molars—do not have enough bone for implants to be placed. Sinus augmentation is a surgical technique for creating a bone window in the sinus. The healing period of sinus augmentation takes about six months before implantation. One of the most common complications of sinus augmentation is perforation of the sinus epithelium (a layer of "skin" of the sinus), which could be a result of sinusitis, excessive bleeding and delayed healing. Zygomatic dental implants offer an alternative treatment option to sinus augmentation. Almost similar to trans-sinus angled dental implants, zygomatic dental implants are long implants that pass through the sinus or laterally to the sinus. While the tip of a trans-sinus implant is positioned in the bone between the anterior sinus wall and the nasal cortical bone, a zygomatic implant anchors itself into the zygomatic process for stability.

Dental implants (including zygomatic dental implants) often have rough surfaces such as threads. Research has shown that osteoblastic cells (cells that develop bone) adhere more quickly to rough surfaces than to smooth surfaces. This property can also aid in osseointegration and guide movement of specific cell types and has the ability to directly affect cell shape and function. However, in some cases when there is no bone, a patient's soft tissue comes into direct contact with the rough surfaces (e.g., with the threads) of the dental implant. This direct interaction between the patient's soft tissue and the, for example, thread (e.g., micro thread, micro grooves, etc.) of the dental implant can cause irritation in the mouth of the patient.

Thus, a need exists for zygomatic dental implants that reduce tissue irritation at the coronal end and also provide a feature for promoting bone growth at the coronal end. The present disclosure is directed to solving these problems and addressing other needs.

SUMMARY

According to some implementations of the present disclosure, a zygomatic dental implant includes a generally cylindrical body, an interior bore, an asymmetrical external feature, and a generally flat feature. The generally cylindrical body has a coronal portion, a middle portion, and an apical portion. The apical portion is for anchoring the zygomatic dental implant in zygoma bone of a patient. The generally cylindrical body has a main-central axis. The interior bore is formed in the coronal portion of the generally cylindrical body. A circumferentially extending wall is defined by at least a portion of an outer surface of the generally cylindrical body and at least a portion of an inner surface of the interior bore. The interior bore has a bore-central axis that is at an angle relative to the main-central axis of the generally cylindrical body. The relative angle of the bore-central axis causes at least a first portion of the circumferentially extending wall to have a varying thickness about a circumference of the first portion. The thickness of the circumferentially extending wall at the first portion varies from a thinnest portion adjacent to a first side of the generally cylindrical body to a thickest portion adjacent to a second opposing side of the generally cylindrical body. The interior bore has a threaded portion for receiving a screw. The screw is configured to removably hold an abutment in engagement with the zygomatic dental implant. The asymmetrical external feature is on at least a portion of the first side of the generally cylindrical body such that the asymmetrical external feature is configured to directly engage alveolar bone of the patient. The asymmetrical external feature includes a plurality of circumferentially extending grooves such that (i) a circumferential length of a first portion of the plurality of circumferentially extending grooves decreases apically, (ii) a circumferential length of a second portion of the plurality of circumferentially extending grooves increases apically, and (iii) each of a third portion of the plurality of circumferentially extending grooves includes a gap. The gaps collectively define a non-grooved area. The non-grooved area is adjacent to the thinnest portion of the circumferentially extending wall of the generally cylindrical body. The generally flat feature is on the second opposing side of the generally cylindrical body such that the generally flat feature is configured to engage soft tissue of the patient. A portion of the generally flat feature is parallel with the main-central axis of the generally cylindrical body.

According to some implementations of the present disclosure, a zygomatic dental implant includes a generally cylindrical body, an interior threaded bore, and an asymmetrical external feature. The generally cylindrical body has a coronal portion and an apical portion. The apical portion is for anchoring the zygomatic dental implant in zygoma bone of a patient. The generally cylindrical body has a main-central axis. The interior threaded bore is formed in the coronal portion of the generally cylindrical body for receiving a screw configured to removably hold an abutment in engagement with the zygomatic dental implant. The interior threaded bore has a bore-central axis. The asymmetrical external feature is on at least a portion of a first side of the generally cylindrical body such that the asymmetrical external feature is configured to directly engage alveolar bone of the patient. The asymmetrical external feature includes a plurality of circumferentially extending grooves.

According to some implementations of the present disclosure, a zygomatic dental implant includes a generally cylindrical body, a non-rotational feature, an interior threaded bore, and an asymmetrical external feature. The generally cylindrical body has a coronal portion and an apical portion. The apical portion is for anchoring the zygomatic dental implant in zygoma bone of a patient. The coronal portion includes a platform. The generally cylindrical body has a main-central axis. The non-rotational feature extends from the platform. The interior threaded bore is formed in the coronal portion of the generally cylindrical body and is for receiving a screw configured to removably hold a fixture in engagement with the zygomatic dental implant for use in installing the zygomatic dental implant in a socket. The interior threaded bore has a bore-central axis that is (i) perpendicular to a plane defined by the platform and (ii) at a non-zero angle relative to the main-central axis of the generally cylindrical body. The bore-central axis intersects the main-central axis of the generally cylindrical body at a point in the plane defined by the platform. The asymmetrical external feature is on at least a portion of a first side of the generally cylindrical body such that the asymmetrical external feature is configured to directly engage alveolar bone of the patient. The asymmetrical external feature includes a plurality of circumferentially extending grooves.

According to some implementations of the present disclosure, a zygomatic dental implant includes a generally cylindrical body, an interior threaded bore, and an asymmetrical external feature. The generally cylindrical body has a coronal portion and an apical portion. The apical portion is for anchoring the zygomatic dental implant in zygoma bone of a patient. The coronal portion includes a platform. The generally cylindrical body has a main-central axis. The interior threaded bore is formed in the coronal portion of the generally cylindrical body for receiving a screw configured to removably hold a fixture in engagement with the zygomatic dental implant for use in installing the zygomatic dental implant in a bone socket. The interior threaded bore has a bore-central axis that is (i) perpendicular to a plane defined by the platform and (ii) at a non-zero angle relative to the main-central axis of the generally cylindrical body. The bore-central axis intersects the main-central axis of the generally cylindrical body at an intersection point. The intersection point is located no more than 0.5 millimeters from the plane defined by the platform. The asymmetrical external feature is on at least a portion of a first side of the generally cylindrical body such that the asymmetrical external feature is configured to directly engage alveolar bone of the patient. The asymmetrical external feature includes a plurality of circumferentially extending grooves.

According to some implementations of the present disclosure, a method of installing a modified stock zygomatic dental implant in a mouth of a patient includes selecting a stock zygomatic dental implant to be installed in the mouth of the patient. The stock zygomatic dental implant has a length between 30 millimeters and 60 millimeters. The stock zygomatic dental implant includes a generally cylindrical body, an interior threaded bore, and an asymmetrical external feature generally positioned on a first side of the generally cylindrical body. Soft tissue in the mouth of the patient adjacent to an installation site is evaluated. Based at least in part on the evaluation, a portion of the generally cylindrical body of the stock zygomatic dental implant on a second side of the generally cylindrical body at a location opposing the asymmetrical external feature is removed, thereby forming a modified stock zygomatic dental implant that, when installed in the mouth of the patient, aids in reducing bulging of the soft tissue.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figure 1A:
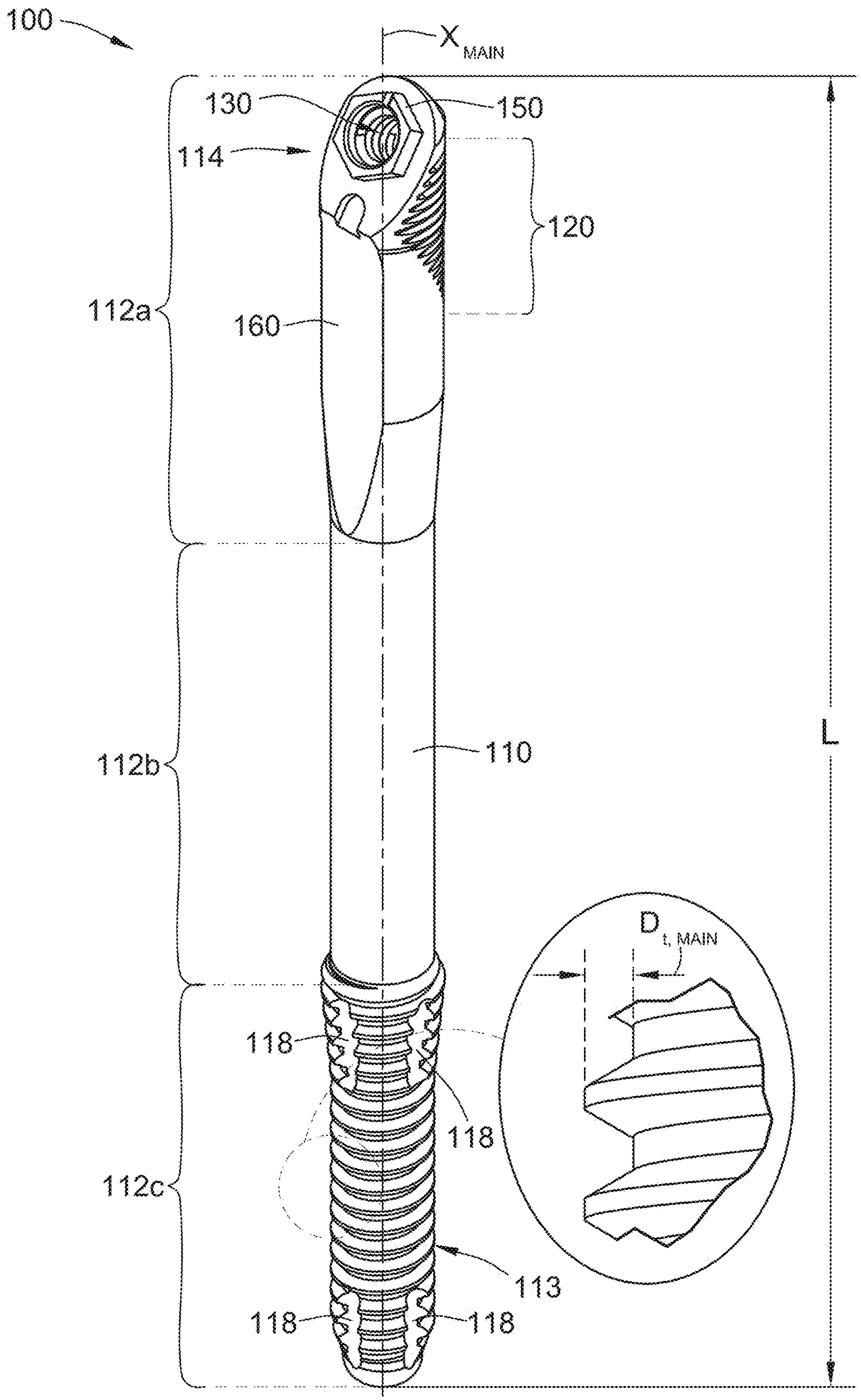
FIG. 1A is a perspective view of a zygomatic dental implant according to some implementations of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Figure 1B:
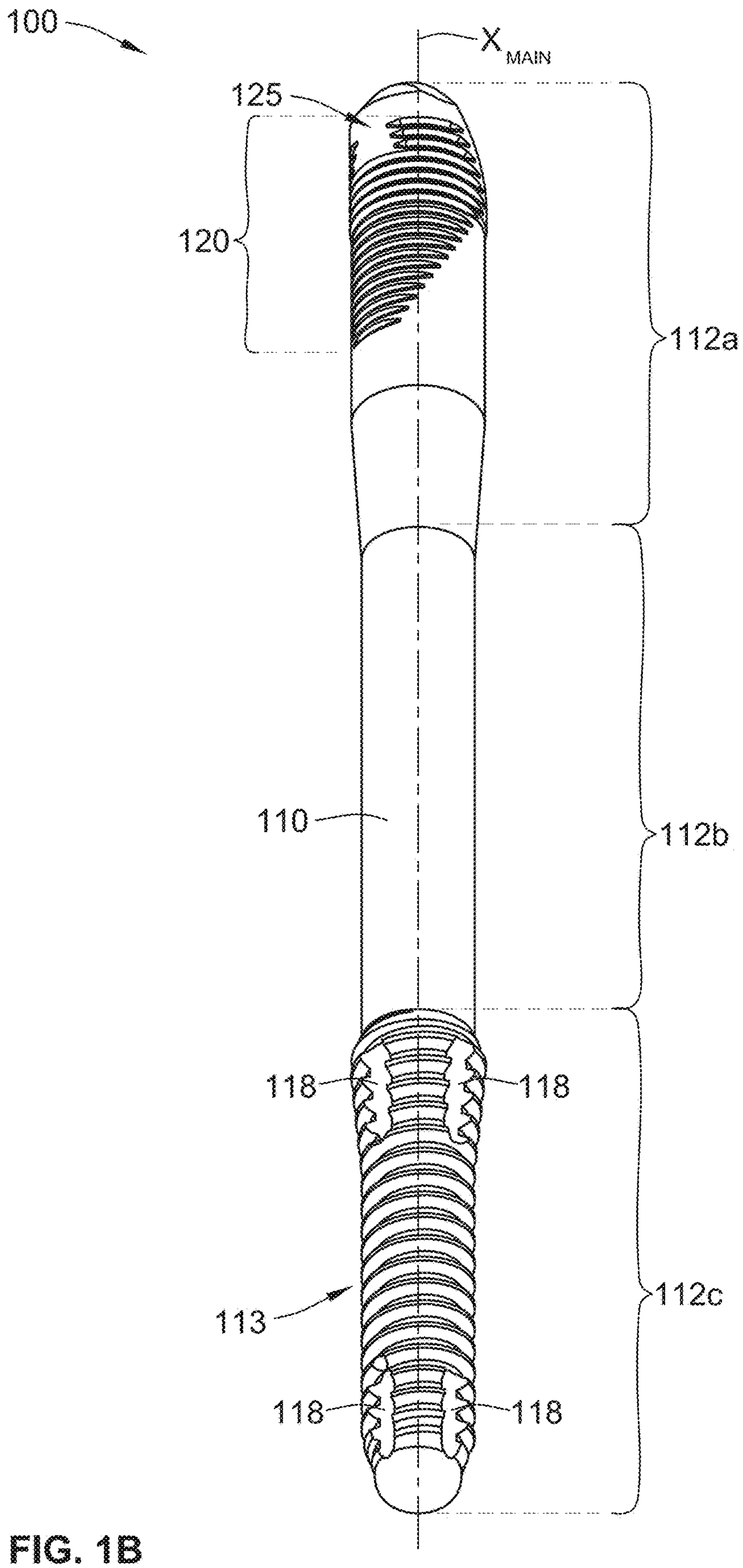
FIG. 1B is another perspective view of the zygomatic dental implant of FIG. 1A.
Figure 2:
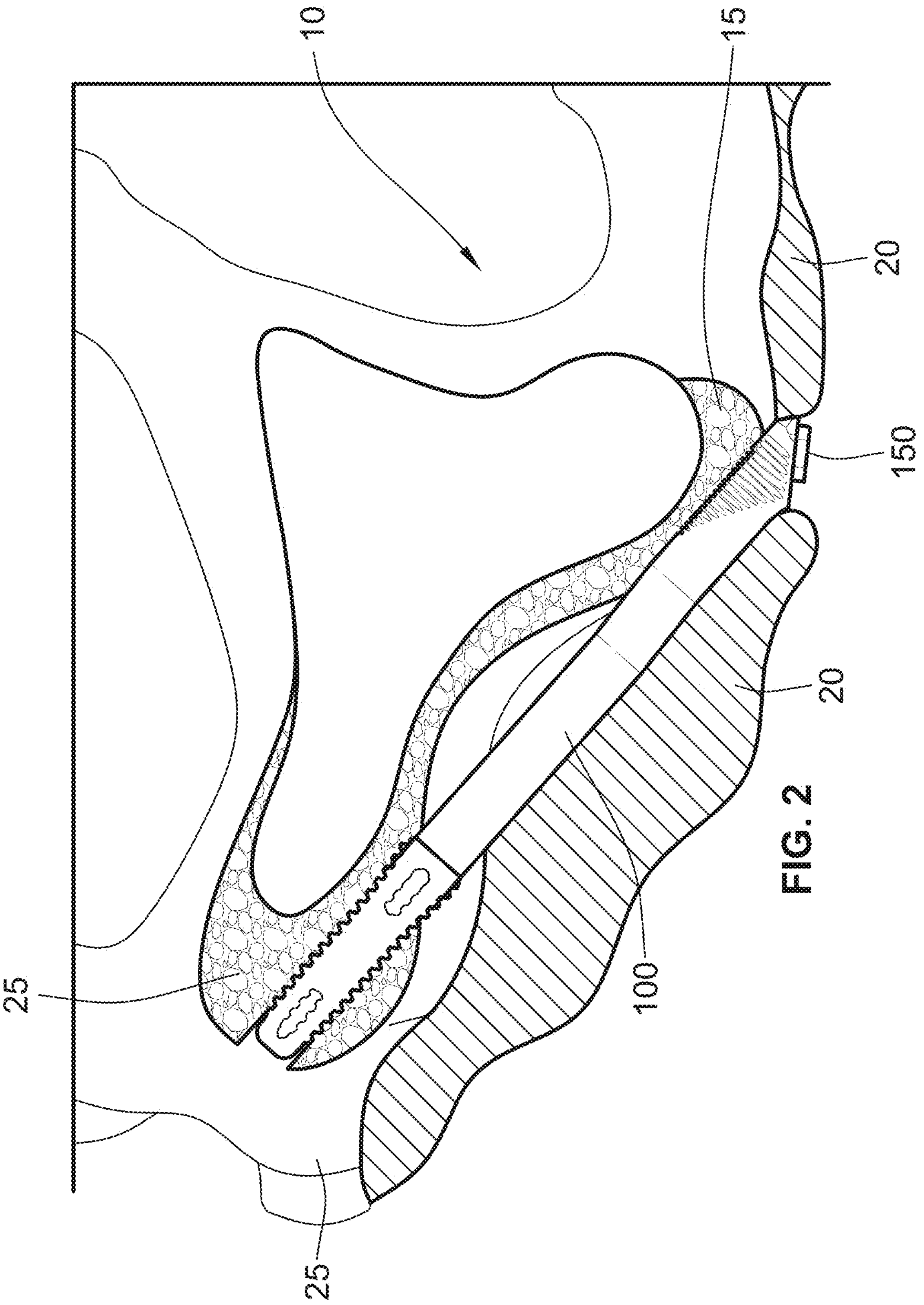
FIG. 2 illustrates the zygomatic dental implant of FIG. 1A implanted in a mouth of a patient.

Referring generally to FIGS. 1A, 1B, and 2, a zygomatic dental implant 100 includes a generally cylindrical body 110, an interior bore 130, a non-rotational feature 150, and an asymmetrical external feature 120. The generally cylindrical body 110 is generally divided into a proximal or coronal portion 112*a*, a middle portion 112*b*, and a distal or apical portion 112*c*. The apical portion 112*c* is for anchoring the zygomatic dental implant 100 in zygoma bone of a patient. The zygomatic dental implant 100 generally differs from other dental implants in that the zygomatic dental implant 100 is significantly longer than non-zygomatic dental implants such that the zygomatic dental implant 100 can be installed into an upper jawbone close to and/or within a zygoma bone 25 in a mouth 10 of a patient (FIG. 2). Zygomatic dental implants may be necessary for patients with resorbed and/or deteriorated jaw bones (e.g., cancer patients) that do not provide the necessary socket for installing a non-zygomatic or more traditional dental implant. In some implementations, one or more zygomatic dental implants are installed in a mouth of a patient (with or without one or more non-zygomatic dental implants) and coupled to one or more abutments, bridges, bars, prosthetic teeth, attachment members, or any combination thereof (e.g., a bridge including prosthetic teeth).

As best shown in FIGS. 1A and 1B, the zygomatic dental implant 100 includes a non-threaded middle portion 112*b* of the generally cylindrical body 110, which is positioned between the coronal portion 112*a* and the apical portion 112*c* of the generally cylindrical body 110. The coronal portion 112*a* includes an asymmetrical external feature 120 about an exterior surface thereof. The apical portion 112*c* includes external threads 113 about an exterior surface thereof. The apical portion 112*c* of the generally cylindrical body 110 includes two rows of a plurality of generally vertical flutes 118 spaced about the circumference of the zygomatic dental implant 100 that cross (e.g., break up) the apical external thread 113. The flutes 118 aid the installation of the zygomatic dental implant 100 by (i) self-tapping the zygomatic dental implant 100 into the patient's bone socket and/or (ii) providing a path for material to be ejected from the cavity (e.g., bone socket) receiving the zygomatic dental implant 100 during installation. More or fewer flutes 118 are also contemplated.

The interior bore 130 is formed in the coronal portion 112*a* of the zygomatic dental implant 100. The interior bore 130 includes a female or internal thread 132 (FIG. 4B) therein to threadingly mate with a screw (not shown) to hold the abutment (not shown) on the zygomatic dental implant 100. The non-rotational feature 150 generally protrudes from the coronal portion 112*a* and is external to the interior bore 130 (e.g., at least to the threaded portion of the interior bore 130). As shown, the non-rotational feature 150 is a six-sided hexagonal boss that can non-rotationally mate with a corresponding non-rotational feature of an abutment in a non-rotational fashion. Various alternative non-rotational features are contemplated, such as, for example, a four-sided square or rectangular boss (not shown), a five-sided polygonal boss (not shown), a twelve-sided polygonal/star boss (not shown), a three-piece clover shaped boss (not shown), etc. In some implementations, the zygomatic dental implant is an internal-connection zygomatic dental implant with an internal socket as a non-rotational feature and not an external boss like the non-rotational feature 150.

The generally cylindrical body 110 of the zygomatic dental implant 100 has a main-central axis $X_{main}$. The main-central axis $X_{main}$ is defined as a straight axis/line that goes through the geometric center and/or the axis of symmetry of at least the apical portion 112*c* of the generally cylindrical body 110 of the zygomatic dental implant 100. However, the main-central axis $X_{main}$ of the zygomatic dental implant 100 does not go through (e.g., is not coincident with) the axis of symmetry of the coronal portion 112*a* of the generally cylindrical body 110. This is because the coronal portion 112*a* of the generally cylindrical body 110 of the zygomatic dental implant 100 includes an angled portion 114 (FIG. 1A) that is angled and/or offset relative to (1) the main-central axis $X_{main}$ of the zygomatic dental implant 100 and (2) the rest of the generally cylindrical body 110 of the zygomatic dental implant 100.

Figures 4B, 5A, 5B:
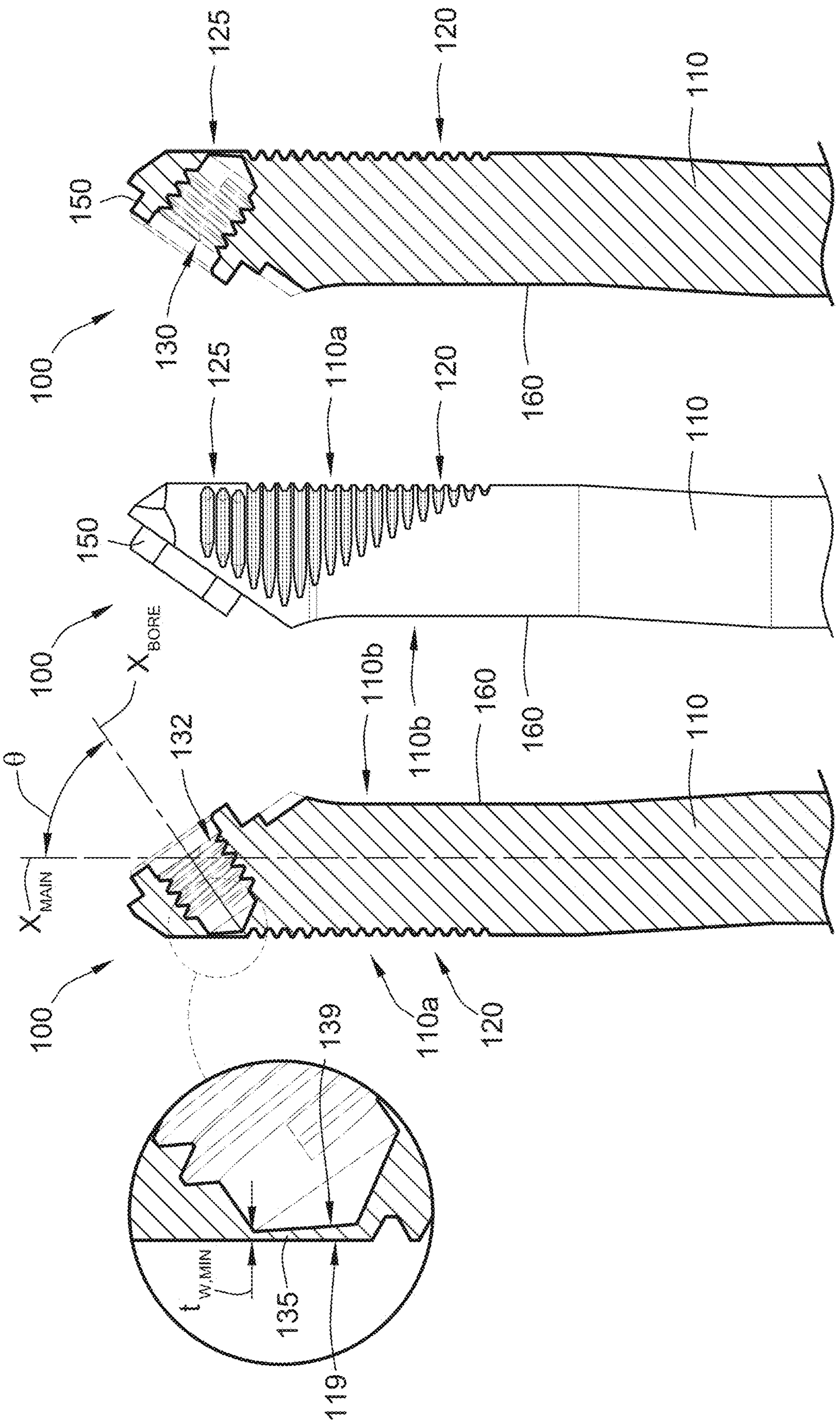
FIG. 4B is a cross-sectional view of the zygomatic dental implant of FIG. 4A.
FIG. 5A is a partial opposing side view of the zygomatic dental implant of FIG. 4A.
FIG. 5B is a cross-sectional view of the of the zygomatic dental implant of FIG. 5A.

The interior bore 130 has a bore-central axis, $X_{bore}$. The bore-central axis $X_{bore}$ is defined as a straight axis/line that goes through the geometric center and/or the axis of symmetry of at least the interior bore 130 of the zygomatic dental implant 100. As best shown in FIG. 4B, the bore-central axis $X_{bore}$ of the interior bore 130 is at an angle θ relative to the main-central axis $X_{main}$ of the zygomatic dental implant 100. The angle θ can be any angle, such as, for example, between about between about 7 degrees and about 65 degrees or between about 40 degrees and about 65 degrees. As shown in FIGS. 4B, the angle θ is about 55 degrees.

The interior bore 130 forms a circumferentially extending wall 135 that is defined by an outer surface 119 of the generally cylindrical body 110 and an inner surface 139 of the interior bore 130. The circumferentially extending wall 135 has a minimum thickness $t_{w,min}$ and a maximum thickness as best shown in FIG. 4B. The minimum and maximum thicknesses of the circumferentially extending wall 135 vary depending on the size of the zygomatic dental implant 100, the inner diameter of the interior bore 130 (which can vary depending on the type/size of screw being used to hold the abutment to the implant), the size (e.g., pitch) of the asymmetrical external feature 120, the size (e.g., pitch) of the internal thread 132, and/or the angle θ of the bore-central axis $X_{bore}$ relative to the main-central axis $X_{main}$.

It is also noted that the minimum thickness $t_{w,min}$ and the maximum thickness of the circumferentially extending wall 135 can depend on the location (e.g., vertical position along a height of the zygomatic dental implant) that the thicknesses are being measured. For example, the minimum thickness $t_{w,min}$ of the circumferentially extending wall 135 near or at the coronal end of the interior bore will be different than the minimum thickness $t_{w,min}$ of the circumferentially extending wall near or at the distal end of the interior bore. Additionally, the thickness of the circumferentially extending wall 135 varies about the circumference (e.g., rotational position about the main-central axis $X_{main}$) of the zygomatic dental implant due to the interior bore being at an angle θ relative to the main-central axis $X_{main}$. As an example, the zygomatic dental implant 100 is a 3.4 diameter zygomatic dental implant (nominal size) with an interior bore 130 having an angle θ of about 55 degrees. In that example, the minimum thickness $t_{w,min}$ of the circumferentially extending wall 135 at or near the distal end of the interior bore 130 is about 0.08 millimeters, which is adjacent to a first side 110*a* of the generally cylindrical body 110 of the zygomatic dental implant 100.

As can be appreciated by the above description and as best shown in FIG. 4B, the thickness of the circumferentially extending wall 135 varies about the circumference (e.g., rotational position about the main-central axis $X_{main}$) of the zygomatic dental implant 100 due to the interior bore 130 being at the angle θ relative to the main-central axis $X_{main}$. For a horizontal cross-section of the generally cylindrical body 110 at or near the distal end of the interior bore 130, the thickness of the circumferentially extending wall 135 varies about the circumference of the zygomatic dental implant 100 from (1) the minimum thickness $t_{w,min}$ at or near the distal end of the interior bore 130 adjacent to the first side 110*a* to (2) a relatively larger and/or maximum thickness at or near the distal end of the interior bore 130 adjacent to a second opposing side 110*b*. Based on the exemplary implementation shown in FIG. 4B of the zygomatic dental implant 100, a ratio of (i) a maximum outer diameter $D_{max,c}$ (e.g., the nominal outer diameter of 4 millimeters) of the generally cylindrical body 110 to (ii) the thinnest portion (e.g., thickness $t_{w,min}$) of the circumferentially extending wall 135 adjacent to the first side 110*a* of the generally cylindrical body 110 is 4 millimeters/0.08 millimeters, which equals 50.

Figure 3B:
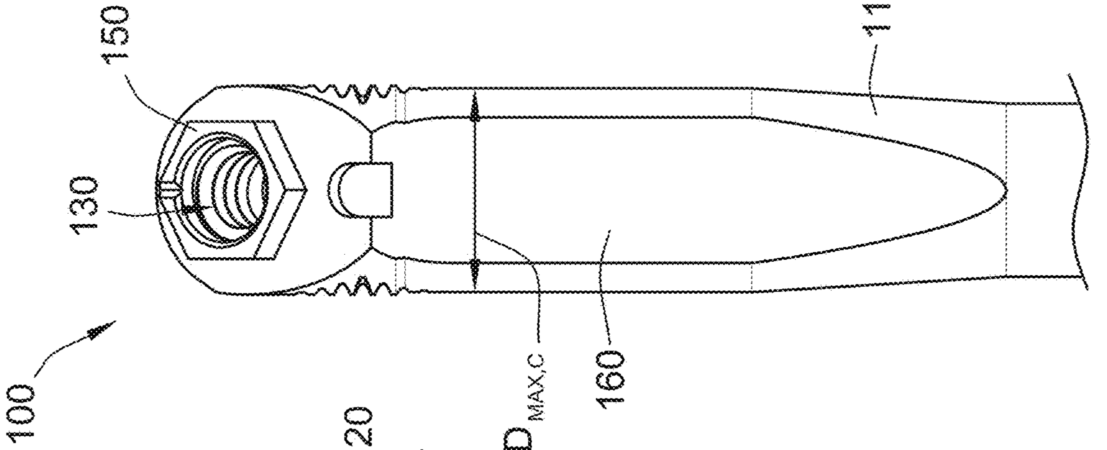
FIG. 3B is a partial front view of the zygomatic dental implant of FIG. 1A.
Figure 3A:
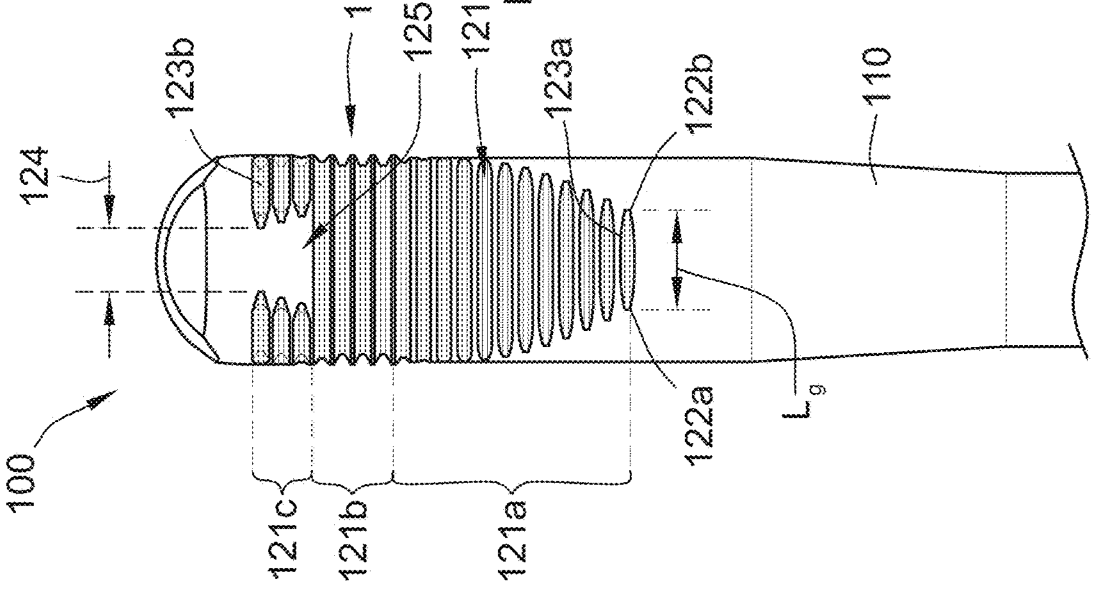
FIG. 3A is a partial back view of the zygomatic dental implant of FIG. 1A.

In summary, the circumferentially extending wall 135 has one or more portions or sections that have a relatively thin thickness compared to the rest of the circumferentially extending wall 135. It is these portions of the circumferentially extending wall 135 that are more prone to breaking/failing/snapping when the zygomatic dental implant 100 is loaded (e.g., coupled with an abutment and crown and used for mastication purposes in a mouth of a patient). The zygomatic dental implants of the present disclosure are able to be machined with relatively smaller outer diameters and/or relatively larger angles as compared with previous dental implants and such relatively smaller zygomatic dental implants can be used in areas of a patient's mouth requiring such smaller sized zygomatic dental implants at least because a non-grooved area 125 (described below) of the asymmetrical external feature 120 is positioned adjacent to the thinnest portion of the circumferentially extending wall 135 as best shown in FIG. 3A.

Referring now to FIGS. 3A-5B, the coronal portion 112*a* of the generally cylindrical body 110 of the zygomatic dental implant 100 includes the asymmetrical external feature 120, where the asymmetrical external feature 120 is configured to directly engage alveolar bone when installed in a mouth of the patient. The asymmetrical external feature 120 includes a plurality of circumferentially extending grooves 121. The plurality of circumferentially extending grooves 121 can be continuous, intermittent, segmented, parallel with each other, angled with respect to horizontal, threaded, truncated threads, or any combination thereof.

Figure 4A:
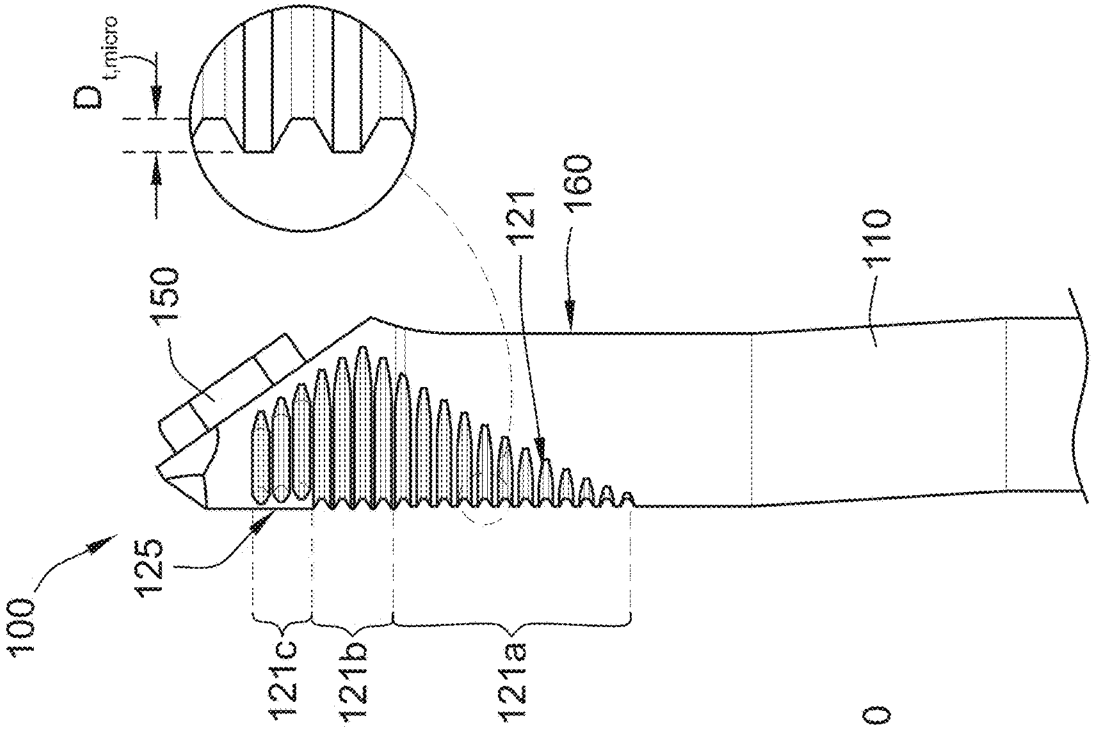
FIG. 4A is a partial side view of the zygomatic dental implant of FIG. 1A.

Each of the circumferentially extending grooves 121 has a circumferential length extending between its ends. For example, as shown in FIG. 3A, a first one of the circumferentially extending grooves 123*a* has a circumferential length $L_g$ defined as a distance between a first end 122*a* and a second end 122*b* of the first circumferentially extending groove 123*a*. In some implementations, the circumferential length $L_g$ of each of the plurality of circumferentially extending grooves 121 is the same, different, or a combination thereof. For example, as best shown in FIGS. 3A and 4A, the circumferential length $L_g$ of a first portion of the plurality of circumferentially extending grooves 121*a* decreases apically. The circumferential length $L_g$ of a second portion of the plurality of circumferentially extending grooves 121*b* increases apically. In other words, the ends of the first portion of the plurality of circumferentially extending grooves 121*a* taper inwardly in an apical direction and the ends of the second portion of the plurality of circumferentially extending grooves 121*b* taper outwardly in the apical direction.

One or more of the circumferentially extending grooves 121 can include a gap that collectively forms the non-grooved area 125. As best shown in FIG. 3A, a second one of the circumferentially extending grooves 123*b* has a gap 124. As shown, a third portion of the plurality of circumferentially extending grooves 121*c* includes three grooves including gaps that form the non-grooved area 125. More or fewer grooves in the third portion 121*c* are contemplated. As discussed above, the non-grooved area 125 is adjacent to the thinnest portion of the circumferentially extending wall 135 on the first side 110*a* of the generally cylindrical body. As such, the minimum thickness $t_{w,min}$ of the circumferentially extending wall 135 near or at the distal end of the interior bore 130 is not further reduced by having a grooved or threaded area therein, which can reduce the thickness of the circumferentially extending wall 135 too much such that the zygomatic dental implant 100 would be too likely to fail when loaded. In sum, as best shown in FIG. 4A, the first portion of the plurality of circumferentially extending grooves 121*a* is formed farthest from the coronal end of the zygomatic dental implant 100; the third portion of the plurality of circumferentially extending grooves 121*c* is formed closest to the coronal end of the zygomatic dental implant 100; the second portion of the plurality of circumferentially extending grooves 121*b* is formed between the first portion 121*a* and the third portion 121*c*.

In some implementations, each of the plurality of circumferentially extending grooves 121 forms at least a portion of a thread (e.g., forming a plurality of truncated threads). In some alternative implementations, the thread (truncated threads) formed by the plurality of circumferentially extending grooves 121 and the apical external thread 113 are the same (e.g., same pitch, same cross-section, and/or same number of starts, etc.). In other implementations, the plurality of circumferentially extending grooves 121 and the apical external threads 113 are different. Various alternative threads, pitches, and ratios are contemplated, such as multi-lead threads on both the thread formed by the plurality of circumferentially extending grooves 121 and the apical external thread 113 with the same or different pitches. The thread formed by the plurality of circumferentially extending grooves 121 and apical external thread 113 can be blended together (e.g., near the middle portion 112*b*) or separate and distinct (e.g., not touching) as best shown in FIGS. 1A and 1B.

In some implementations, the thread formed by the plurality of circumferentially extending grooves 121 (about the coronal portion 112*a*) is a micro thread and the external thread 113 (about the apical portion 112*c*) is a main thread 113 in that the main thread 113 is for deeper, primary engagement with the bone. In such implementations, the micro thread (FIG. 4A) has a relatively smaller thread depth $D_{t,micro}$ as compared with the thread depth $D_{t,main}$ of the main thread 113 (FIG. 1A). As such, the circumferentially extending wall 135 at the coronal end of the zygomatic dental implant 100 can be relatively thicker than it would have been if the thread depth $D_{t,micro}$ of the asymmetrical external feature 120 was as large as the thread depth $D_{t,main}$ of the apical external thread 113. With the circumferentially extending wall 135 being relatively thicker, the zygomatic dental implant 100 is relatively stronger. Furthermore, having a micro thread (or groove) at the coronal portion 112*a* of the zygomatic dental implant 100 increases the ability to transfer load to the bone of the patient, and also aids the osseointegration process.

In some exemplary implementations, the thread depth $D_{t,micro}$ of the thread formed by the plurality of circumferentially extending grooves 121 is in the range from about 0.05 millimeters to 0.4 millimeters and the thread depth $D_{t,main}$ of the apical external thread is in the range from about 0.2 millimeters to about 0.6 millimeters. In some other exemplary implementations, the thread depth $D_{t,micro}$ of the thread formed by the plurality of circumferentially extending grooves 121 is in the range from about 0.1 millimeters to 0.2 millimeters and the thread depth $D_{t,main}$ of the apical external thread is in the range from about 0.3 millimeters to about 0.5 millimeters. For example, the thread depth $D_{t,micro}$ of the plurality of circumferentially extending grooves 121 is about 0.15 millimeters and the thread depth $D_{t,main}$ of the apical external thread is about 0.45 millimeters.

As best illustrated in FIG. 2, when installed, the first side 110*a* of the generally cylindrical body 110 of the zygomatic dental implant 100 is positioned to engage alveolar bone 15 of a patient. Further, the zygomatic dental implant 100 includes and positions the asymmetrical external feature 120 on the first side 110*a* to provide roughness, which promotes bone growth. The plurality of circumferentially extending grooves 121 do not extend all around the generally cylindrical body 110 (which aids in the asymmetrical shape of the asymmetrical external feature 120) because the second opposing side 110*b* of the zygomatic dental implant 100 is typically in direct contact with soft tissue 20 (not bone) and including the plurality of circumferentially extending grooves 121 on the second opposing side 110*b* can create an aesthetically undesirable soft tissue bulge and/or irritate the soft tissue.

According to some implementations, the zygomatic dental implant 100 is customizable by the surgeon and/or clinician to modify the generally cylindrical body 110 according to anatomy of a patient (e.g., how much bone and soft tissue the patient has in the mouth where the soft tissue is in direct contact with the coronal end 112*a* of the zygomatic dental implant 100). In some implementations, the generally cylindrical body 110 of the zygomatic dental implant 100 includes a generally flat feature 160 on the second opposing side 110*b* such that the generally flat feature 160 is configured to engage the soft tissue 20 of the patient, creating less bulging than would occur without the generally flat feature 160 (e.g., a generally cylindrical surface), which can aid in a resulting thinning of the soft tissue (e.g., a more aesthetically pleasing look). In some instances, the flat feature 160 is formed on the coronal portion 112*a* of the generally cylindrical body 110; in other instances, the flat feature 160 is a cutout from the coronal portion 112*a* of the generally cylindrical body 110.

In some exemplary implementations, the asymmetrical external feature 120 has an overall length, along the main-central axis, between four millimeters and twenty millimeters. In some implementations, the first portion of the plurality of circumferentially extending grooves 121*a*, which includes the grooves 121 with circumferential lengths that decrease apically, has an overall length, along the main-central axis, between two millimeters and ten millimeters. The second portion of the plurality of circumferentially extending grooves 121*b*, which includes the grooves 121 with circumferential lengths that increase apically, has an overall length, along the main-central axis, between two millimeters and four millimeters. The third portion of the plurality of circumferentially extending grooves 121*c*, which includes the gaps 124, has an overall length, along the main-central axis, between two millimeters and four millimeters.

In some such implementations, a ratio of the length L (FIG. 1A) of the generally cylindrical body 110 to the length of the asymmetrical external feature 120 is between about 2 to about 18. In some such implementations, a ratio of the length L (FIG. 1A) of the generally cylindrical body 110 to the length of the first portion of the plurality of circumferentially extending grooves 121*a* is between about two to about thirty-five. In some such implementations, a ratio of the length L (FIG. 1A) of the generally cylindrical body 110 to the length of the second portion of the plurality of circumferentially extending grooves 121*b* is between about five to about thirty-five. In some such implementations, a ratio of the length L (FIG. 1A) of the generally cylindrical body 110 to the length of the third portion of the plurality of circumferentially extending grooves 121*c* is between about five to about thirty-five.

Throughout the present disclosure, reference is made to various sized dental implants. To identify the various dental implants of the present disclosure, the zygomatic dental implants may be referred to as having a nominal size. For example, the nominal size may generally or nominally refer to a zygomatic dental implant's maximum outer diameter or width. This maximum outer diameter can refer to the maximum outer diameter $D_{max,c}$ of the coronal portion 112*a* (FIG. 3B). By way of example, the zygomatic dental implant 100 can be referred to as a 3.4 millimeter dental implant, which is the nominal maximum outer diameter $D_{max,c}$ of the coronal portion 112*a*. By nominal, it is meant that the outer diameter $D_{max,c}$ is about 3.4 millimeters and not necessarily exactly 3.4 millimeters. By about 3.4 millimeters it is meant that the dimension has a tolerance of about plus or minus 0.1 millimeter. By way of another example, the zygomatic dental implant 100 can be referred to as a 5.0 millimeter dental implant, which is the nominal maximum outer diameter $D_{max,c}$ of the coronal portion 112*a*. By nominal, it is meant that the outer diameter $D_{max,c}$ is about 5.0 millimeters and not necessarily exactly 5.0 millimeters. By about 5.0 millimeters it is meant that the dimension has a tolerance of about plus or minus 0.1 millimeter. Various other nominal maximum outer dimeter dental implants are contemplated, e.g., 3.0, 3.5, 4.0, 4.5, 5.0, 5.5, 6.0, etc.

In some implementations, the coronal portion 112*a* of the generally cylindrical body 110 has a relatively larger maximum outer diameter than the maximum outer diameter of the non-threaded middle portion 112*b* of the generally cylindrical body 110 and the maximum outer diameter of the apical portion 112*c* of the generally cylindrical body 110. For example, (i) the maximum outer diameter of the threaded coronal portion 112*a* is about 4.1 millimeters and (ii) the maximum outer diameter of the threaded apical portion 112*c* and the maximum outer diameter of the non-threaded middle portion 112*b* is between about 3.2 millimeters and about 4 millimeters. Alternatively, the maximum outer diameter of the threaded apical portion 112*c* and the maximum outer diameter of the non-threaded middle portion 112*b* are the same as, or about the same as, the maximum outer diameter of the threaded coronal portion 112*a*.

A method of installing the zygomatic dental implant 100, the zygomatic dental implant 300 (described below), or the zygomatic dental implant 400 (described below), or any zygomatic dental implant, in a mouth of a patient is now described according to some implementations of the present disclosure. Initially, a surgeon or clinician evaluates a patient's anatomy (e.g., mouth, bone, soft tissue, x-rays, CT scan, etc.) and selects the zygomatic dental implant 100, 300, 400 based at least in part on the evaluation (e.g., from a set of zygomatic dental implants). The selected zygomatic dental implant 100, 300, 400 has a diameter and length appropriate for the patient. In some implementations, the selected zygomatic dental implant 100, 300, 400 to be installed in the mouth of the patient has a length between 30 millimeters and 60 millimeters. Further, the surgeon and/or clinician evaluates the soft tissue in the mouth of the patient adjacent to the site of installation of the zygomatic dental implant 100, 300, 400. Specifically, for the zygomatic dental implants 100, 300, the surgeon and/or clinician evaluates to determine if the generally flat feature 160, 360 should be further modified (e.g., shaved, cut, added to/built up, etc. or any combination) such that soft tissue has an aesthetically pleasing appearance with the zygomatic dental implant 100, 300 installed. Then, based at least in part on this soft tissue evaluation, the surgeon and/or clinician modifies the generally cylindrical body 110, 310 of the zygomatic dental implant 100, 300 on the second side 110*b*, 310*b* (FIG. 4B for implant 100 and FIG. 7C for implant 300) of the generally cylindrical body 110, 310, thereby forming a modified version of the zygomatic dental implant 100, 300 that, when installed in the mouth of the patient, aids in producing an aesthetically pleasing gingival appearance (e.g., reducing bulging of the soft tissue, increasing bulging of the soft tissue, altering the shape/profile/margin of the gingival tissue, etc.).

While the asymmetrical external feature 120 and the opposing generally flat feature 160 are shown in FIGS. 1A-5B as having a specific orientation and position about the main-central axis $X_{main}$ of the generally cylindrical body 110, it is contemplated that in some alternative implementations, the asymmetrical external feature 120 and/or the opposing generally flat feature 160 can be rotated about the main-central axis $X_{main}$ of the generally cylindrical body 110 such that the asymmetrical external feature 120 and/or the opposing generally flat feature 160 have a different orientation and/or position relative to the interior bore 130 and the non-rotational feature 150 of the zygomatic dental implant 100.

For example, in some such alternative implementations, the asymmetrical external feature 120 and/or the opposing generally flat feature 160 are rotated relative to their positions shown in FIGS. 1A-5B about the main-central axis $X_{main}$ of the generally cylindrical body 110 about five degrees clockwise or counterclockwise, about ten degrees clockwise or counterclockwise, about fifteen degrees clockwise or counterclockwise, about twenty degrees clockwise or counterclockwise, about twenty-five degrees clockwise or counterclockwise, about forty-five degrees clockwise or counterclockwise, about sixty degrees clockwise or counterclockwise, about seventy-five degrees clockwise or counterclockwise, about ninety degrees clockwise or counterclockwise, or any amount/degree in-between.

Figures 6A, 6B, 6C, 6D:
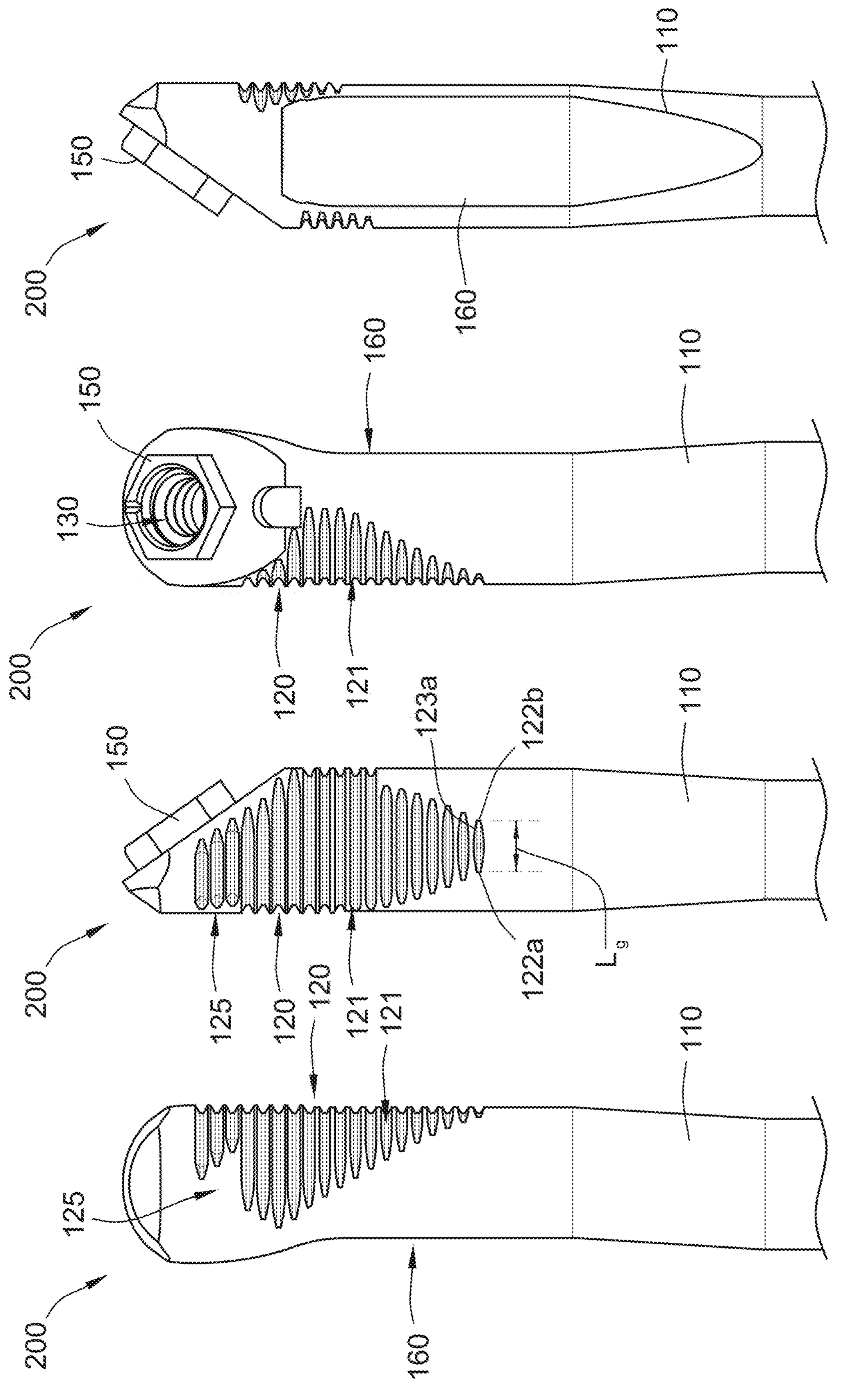
FIG. 6A is a partial back view of a zygomatic dental implant according to some other implementations of the present disclosure.
FIG. 6B is a partial side view of the zygomatic dental implant of FIG. 6A.
FIG. 6C is a partial front view of the zygomatic dental implant of FIG. 6A.
FIG. 6D is a partial opposing side view of the zygomatic dental implant of FIG. 6B.

A specific example of such alternatives is shown in FIGS. 6A-6D. As shown, zygomatic dental implant 200 is the same as, or similar to, zygomatic dental implant 100, where like reference numbers are used for like elements, except that the asymmetrical external feature 120 and the opposing generally flat feature 160 of the zygomatic dental implant 200 are rotated about ninety degrees about the main-central axis $X_{main}$ of the generally cylindrical body 110 as compared with the orientation and position of the asymmetrical external feature 120 and the opposing generally flat feature 160 of the zygomatic dental implant 100 (FIGS. 1A-5B). Additionally, the circumferential lengths $L_g$ of one or more of the circumferentially extending grooves 121 of the asymmetrical external feature 120 are modified to fit about the angled face of at the coronal end due to the zygomatic dental implant 200 being an angled dental implant. As best shown in FIG. 6A, the three most coronal ones of the circumferentially extending grooves 121 are shortened as compared with the immediately more apical groove 121 a sufficient amount such that the non-grooved area 125 is maintained adjacent to the thinnest portion of the circumferentially extending wall 135. More or less of the grooves 121 can be shortened to maintain the non-grooved area 125 for at least the reasons described above.

The zygomatic dental implant 100 described above and shown in FIGS. 1A-5B includes the asymmetrical external feature 120 generally positioned on the back or rear of the generally cylindrical body 110 and with the opposing generally flat feature 160 generally positioned on the front of the generally cylindrical body 110, where the front is defined by the direction that the non-rotational feature 150 faces or points towards. The zygomatic dental implant 100 with such an orientation of the asymmetrical external feature 120 and the generally flat feature 160 can be referred to as a zygomatic dental implant having a non-shifted asymmetrical external feature.

The zygomatic dental implant 200 described above and shown in FIGS. 6A-6D includes the asymmetrical external feature 120 generally positioned on the side of the generally cylindrical body 110 and with the opposing generally flat feature 160 generally positioned on the opposing side of the generally cylindrical body 110, where the front is defined by the direction that the non-rotational feature 150 faces or points towards. The zygomatic dental implant 200 with such an orientation of the asymmetrical external feature 120 and the generally flat feature 160 can be referred to as a zygomatic dental implant having a shifted asymmetrical external feature.

Figure 7A:
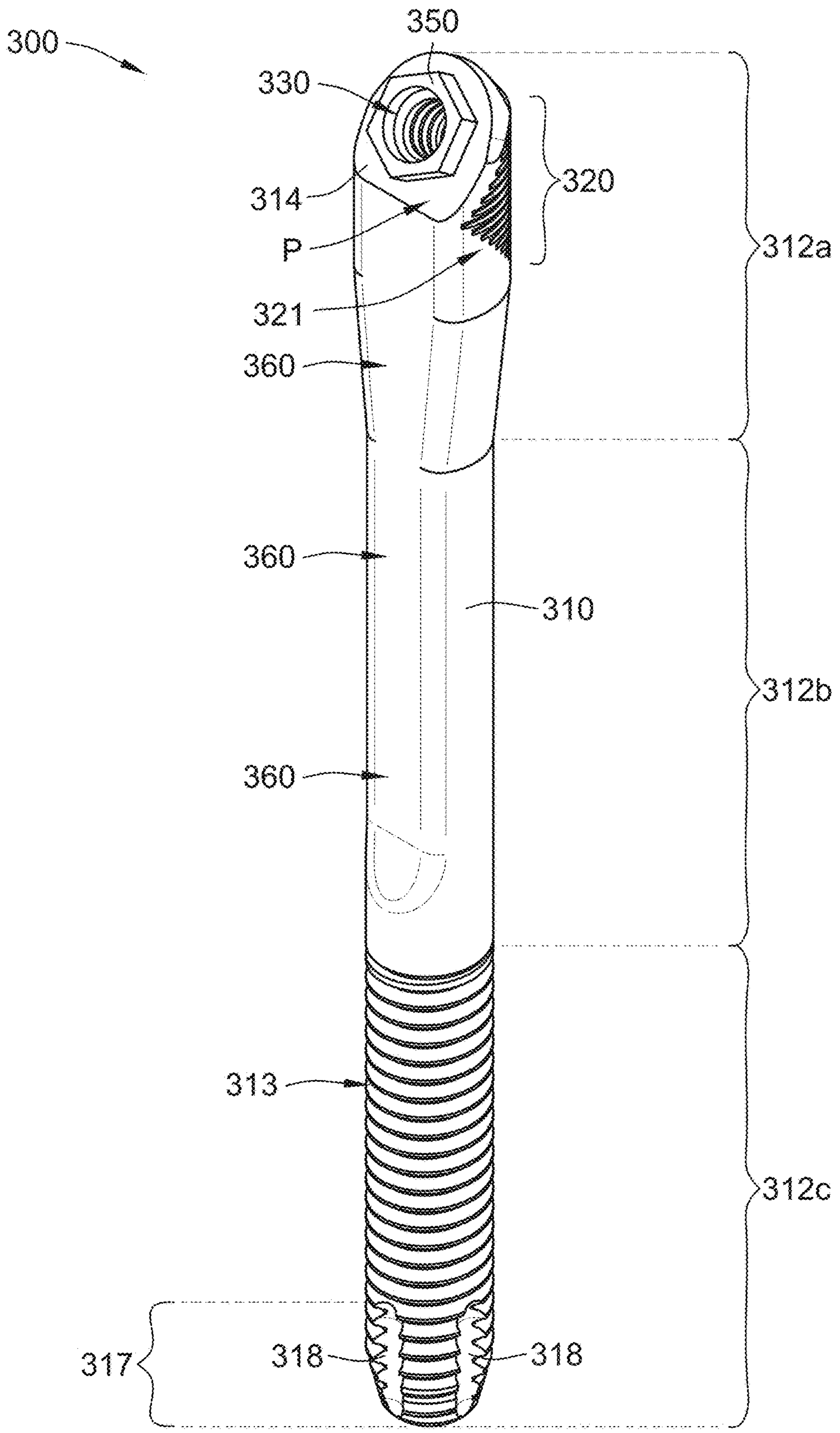
FIG. 7A is a perspective view of a zygomatic dental implant according to some implementations of the present disclosure.
Figure 7B:
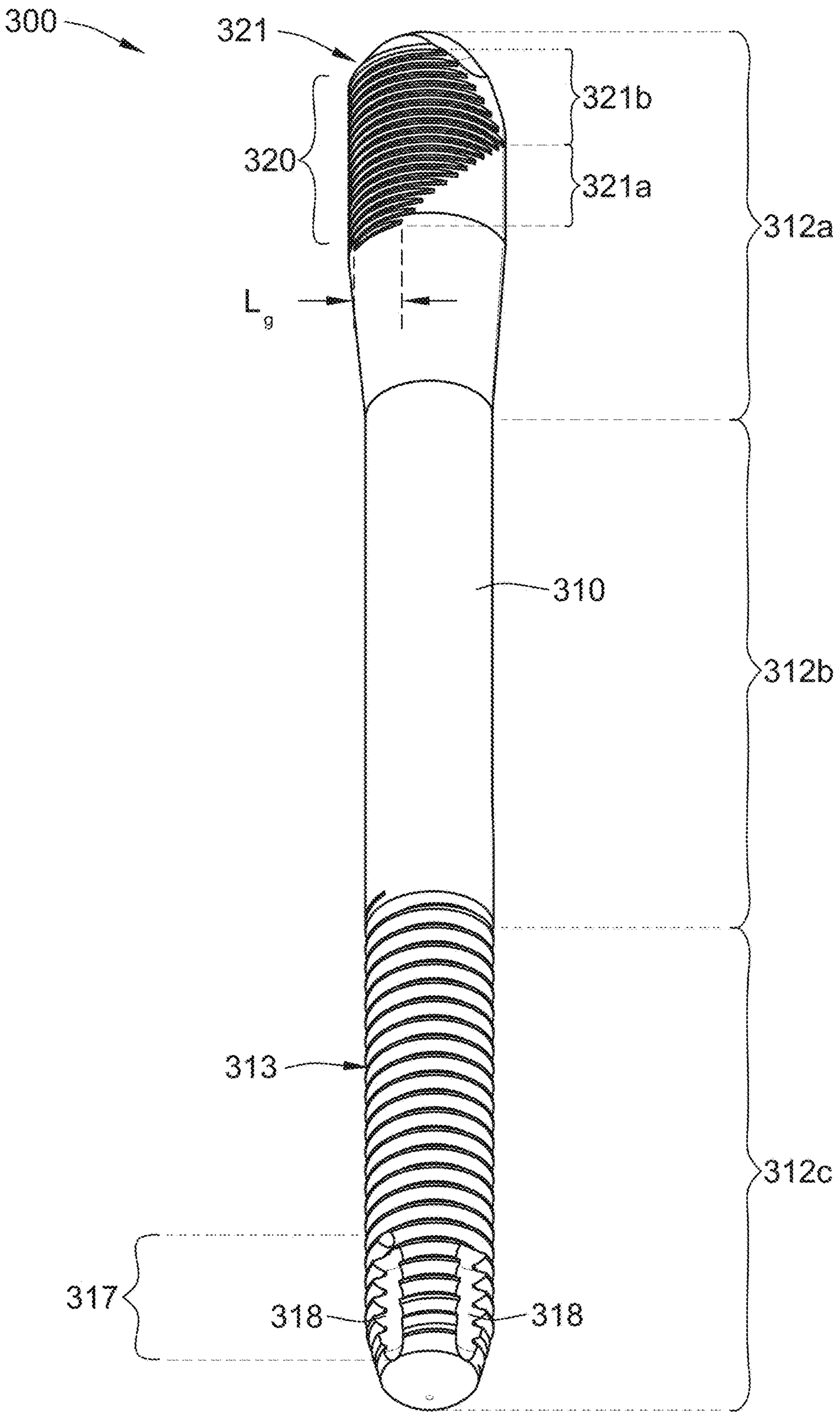
FIG. 7B is another perspective view of the zygomatic dental implant of FIG. 7A.
Figure 7C:
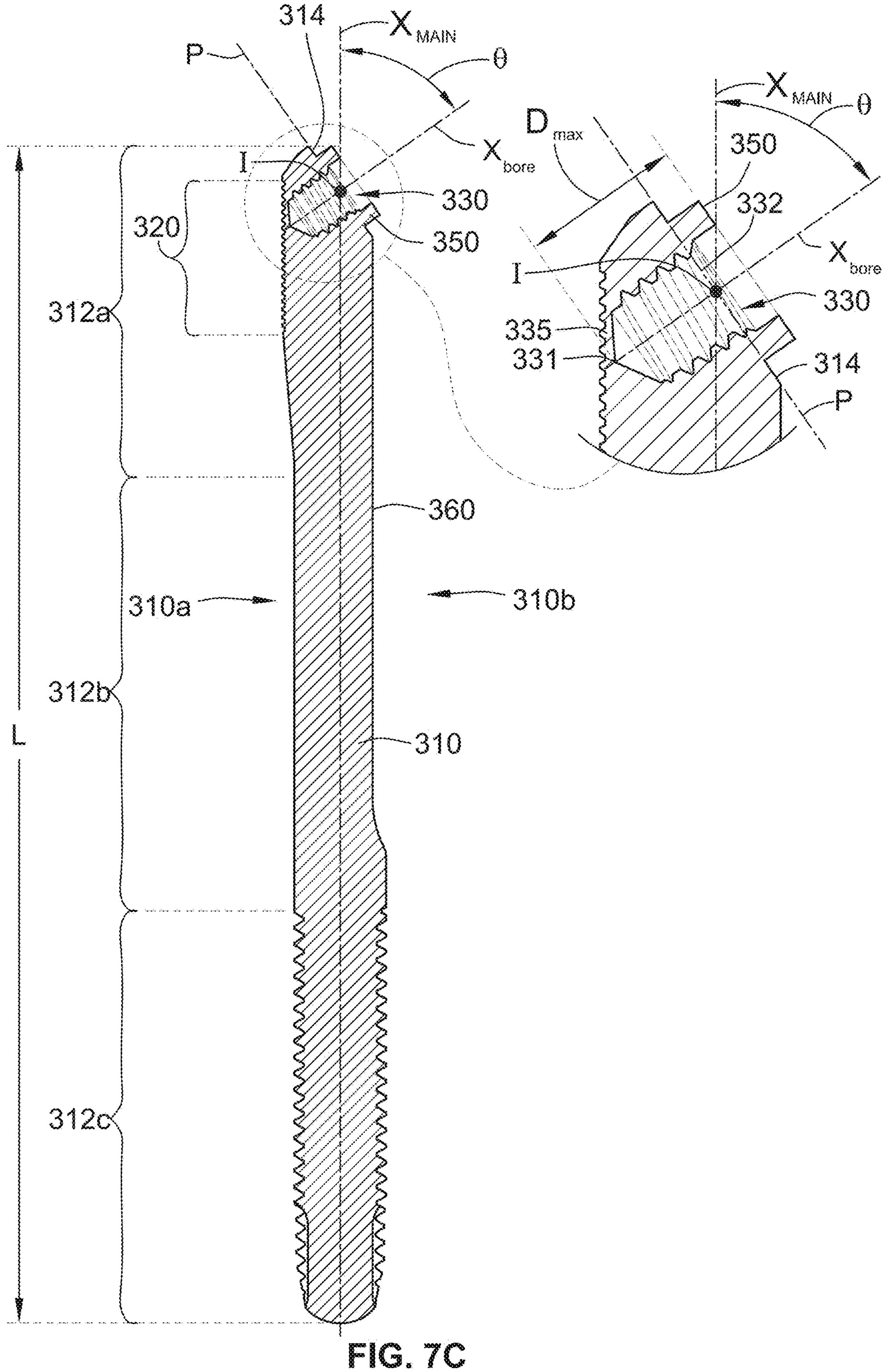
FIG. 7C is a side cross-sectional view of the zygomatic dental implant of FIG. 7A.

Referring generally to FIGS. 7A-7C, a zygomatic dental implant 300 includes a generally cylindrical body 310, an interior threaded bore 330, a non-rotational feature 350, and an asymmetrical external feature 320. The generally cylindrical body 310 has a first side 310*a* and a second opposing side 310*b*. The generally cylindrical body 310 can also be generally divided into a proximal or coronal portion 312*a*, a middle portion 312*b*, and a distal or apical portion 312*c*. The apical portion 312*c* is for anchoring the zygomatic dental implant 300 in zygoma bone of a patient.

In some implementations, the generally cylindrical body 310 of the zygomatic dental implant 300 includes a generally flat feature 360 on the second opposing side 310*b* such that the generally flat feature 360 is configured to engage soft tissue of the patient (e.g., similarly to how the generally flat feature 160 engages the soft tissue 20 in FIG. 2), creating less bulging than would occur without the generally flat feature 360 (e.g., a generally cylindrical surface), which can aid in a resulting thinning of the soft tissue (e.g., a more aesthetically pleasing look).

The zygomatic dental implant 300 generally differs from other dental implants in that the zygomatic dental implant 300 is significantly longer than non-zygomatic dental implants such that the zygomatic dental implant 300 can be installed into an upper jawbone close to and/or within a zygoma bone in a mouth of a patient in the same, or similar, manner as zygomatic dental implant 100 shown in FIG. 2. The zygomatic dental implant 300 is the same as, or similar to, the zygomatic dental implant 100 in many aspects; however, the zygomatic dental implant 300 mainly differs from the zygomatic dental implant 100 in that (1) the generally flat feature 360 of the zygomatic dental implant 300 extends relatively further apically (e.g., from the coronal portion 312*a* to the apical portion 312*c*) than the generally flat feature 160 of the zygomatic dental implant 100; and (2) the asymmetrical external feature 320 of the zygomatic dental implant 300 does not include a non-grooved area like the non-grooved area 125 of the zygomatic dental implant 100.

As shown in FIGS. 7A-7C, the zygomatic dental implant 300 includes a non-threaded middle portion 312*b* of the generally cylindrical body 310, which is positioned between the coronal portion 312*a* and the apical portion 312*c* of the generally cylindrical body 310. Alternatively, all of, or a portion of, the non-threaded middle portion 312*b* can include one or more threads, grooves, projections, or any combination thereof.

The coronal portion 312*a* includes the asymmetrical external feature 320 about an exterior surface thereof that includes a plurality of circumferentially extending grooves 321. The asymmetrical external feature 320 and the plurality of circumferentially extending grooves 321 are the same as, or similar to, the asymmetrical external feature 120 and the plurality of circumferentially extending grooves 121 of the zygomatic dental implant 100 described above except that the asymmetrical external feature 320 does not include a non-grooved area like the non-grooved area 125 of the zygomatic dental implant 100. According to some such implementations, the zygomatic dental implant 300 does not include a non-grooved area because the zygomatic dental implant 300 has a relatively larger diameter than the zygomatic dental implant 100 such that a bottom 331 (FIG. 7C) of the interior threaded bore 330 is spaced sufficiently from the exterior surface of the first side 310*a* of the zygomatic dental implant 300. Put another way, a circumferentially extending wall 335 (FIG. 7C) formed by the interior threaded bore 330, which is the same as, or similar to, the circumferentially extending wall 135, has a minimum thickness that is sufficient to permit the plurality of circumferentially extending grooves 321 to extend along the first side 310*a* and adjacent to the bottom of the interior threaded bore 330 without being prone to easily break/snap/fail.

Figure 9B:
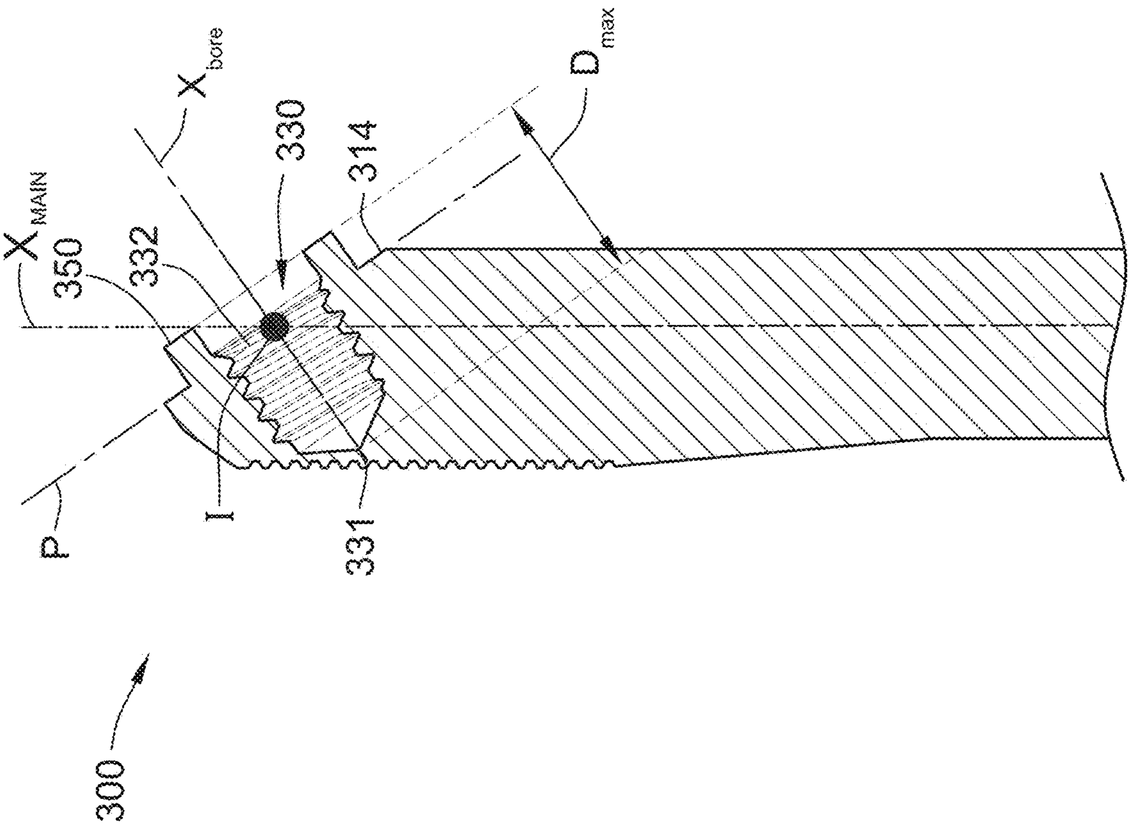
FIG. 9B illustrates a side cross-section view of the upper portion of the zygomatic dental implant of FIG. 9A.
Figure 9A:
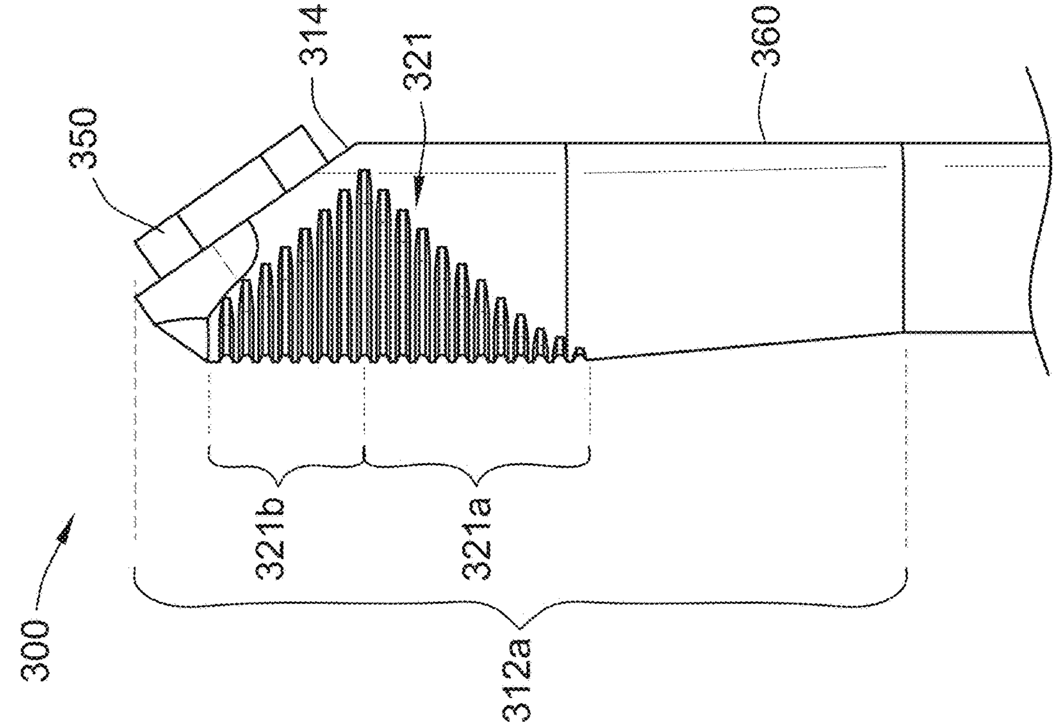
FIG. 9A illustrates a side elevation view of an upper portion of the zygomatic dental implant of FIG. 7A.
Figure 9D:
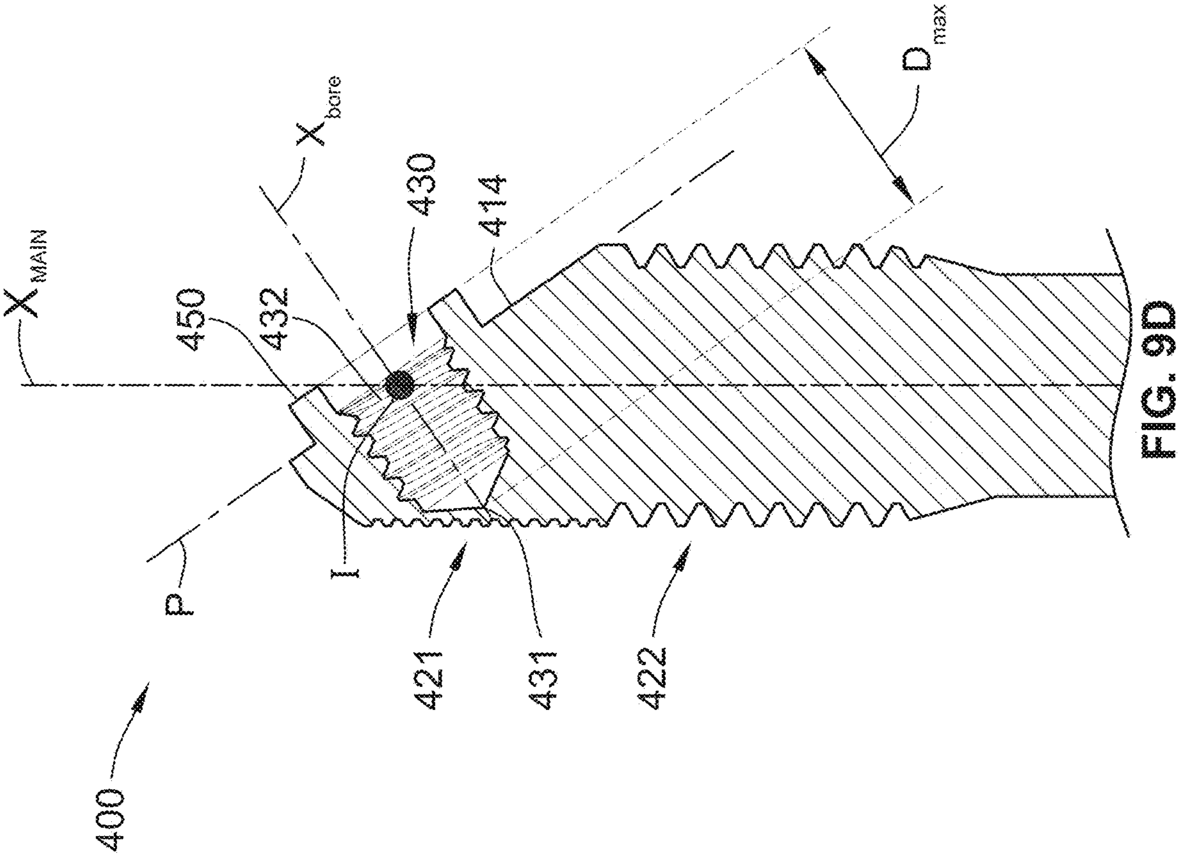
FIG. 9D illustrates a side cross-section view of the upper portion of the zygomatic dental implant of FIG. 9C.

In some implementations, a circumferential length $L_g$ of each of the plurality of circumferentially extending grooves 321 is the same, different, or a combination thereof. For example, as best shown in FIGS. 7B and 9A, the circumferential length $L_g$ of a first portion of the plurality of circumferentially extending grooves 321*a* decreases apically in the same, or similar, fashion as the first portion of the plurality of circumferentially extending grooves 121*a*. The circumferential length $L_g$ of a second portion of the plurality of circumferentially extending grooves 321*b* increases apically in the same, or similar, fashion as the first portion of the plurality of circumferentially extending grooves 121*b*. In other words, the ends of the first portion of the plurality of circumferentially extending grooves 321*a* taper inwardly in an apical direction and the ends of the second portion of the plurality of circumferentially extending grooves 321*b* taper outwardly in the apical direction.

The apical portion 312*c* includes external threads 313 about an exterior surface thereof which are the same as, or similar to, the external threads 113 of the zygomatic dental implant 100. The apical portion 312*c* of the generally cylindrical body 310 includes one row 317 of a plurality of generally vertical flutes 318 spaced about the circumference of the zygomatic dental implant 300 that cross (e.g., break up) the apical external thread 313. The flutes 318 aid the installation of the zygomatic dental implant 300 by (i) self-tapping the zygomatic dental implant 300 into the patient's bone socket and/or (ii) providing a path for material to be ejected from the cavity (e.g., bone socket) receiving the zygomatic dental implant 300 during installation. More or fewer flutes 318 in the single row and/or in one or more additional rows (e.g., as discussed above in connection with the two rows of flutes 118 in the zygomatic dental implant 100) are also contemplated.

The interior threaded bore 330 is formed in the coronal portion 312*a* of the zygomatic dental implant 300, which is the same as, or similar to, the interior bore 130 of the zygomatic dental implant 100 described above. The interior threaded bore 330 includes a female or internal thread 332 therein to threadingly mate with a first screw 602*a* (shown in FIGS. 10A and 10B) to hold an abutment (not shown) and/or a first fixture 601*a* (shown in FIGS. 10A and 10B and described below) on the zygomatic dental implant 300. The interior threaded bore 330 has a maximum depth $D_{MAX}$. In some implementations, the maximum depth $D_{MAX}$ is between about 2.3 millimeters and 2.7 millimeters. In some implementations, the maximum depth $D_{MAX}$ is about 1.5 millimeters, 1.6 millimeters, 1.7 millimeters, 1.8 millimeters, 1.9 millimeters, 2.0 millimeters, 2.1 millimeters, 2.2 millimeters, 2.3 millimeters, 2.4 millimeters, 2.5 millimeters, 2.6 millimeters, 2.7 millimeters, 2.8 millimeters, 2.9 millimeters, or 3.0 millimeters. As shown, the maximum depth $D_{MAX}$ is shown as including the depth of the non-rotational feature 350. Alternatively, the maximum depth $D_{MAX}$ does not include the depth of the non-rotational feature 350. The maximum depth $D_{MAX}$ is selected to work with standard screws of components that mate with the zygomatic dental implant 300, such as, for example, abutments, fixtures, tools, crowns, prostheses, etc. If the maximum depth $D_{MAX}$ is not large enough to accommodate standard length screws that are typically supplied with components that mate with the zygomatic dental implant 300, the supplied screws will not work (e.g., the screw may bottom out such that a head of the screw is not fully engaged/seated). As such, it can be desirable for the maximum depth $D_{MAX}$ of the zygomatic dental implant to be selected in view of the length of standard screws supplied with components that mate with the zygomatic dental implant. According to some implementations, screws supplied with components that mate with zygomatic dental implants have a length between about 3 millimeters and about 4 millimeters. Alternatively, relatively shorter screws can be used to work with relatively shorter threaded bores.

The non-rotational feature 350 generally protrudes from the coronal portion 312*a* and is external to the interior threaded bore 330 and is the same as, or similar to, the non-rotational feature 150 of the zygomatic dental implant 100 described above.

The generally cylindrical body 310 of the zygomatic dental implant 300 has a main-central axis $X_{main}$ (FIG. 7C). The main-central axis $X_{main}$ is defined as a straight axis/line that goes through the geometric center and/or the axis of symmetry of at least the apical portion 312*c* of the generally cylindrical body 310 of the zygomatic dental implant 300. However, the main-central axis $X_{main}$ of the zygomatic dental implant 300 does not go through (e.g., is not coincident with) the axis of symmetry of the coronal portion 312*a* of the generally cylindrical body 310. This is because the coronal portion 312*a* of the generally cylindrical body 310 of the zygomatic dental implant 300 includes an angled portion 314 (best shown in FIG. 7A) that is angled and/or offset relative to (1) the main-central axis $X_{main}$ of the zygomatic dental implant 300 and (2) the rest of the generally cylindrical body 310 of the zygomatic dental implant 300. The angled portion 314 is generally referred to as a platform of the zygomatic dental implant 300. The angled portion 314 is the same as, or similar to, the angled portion 114 of the zygomatic dental implant 100.

As best shown in FIG. 7C, the interior threaded bore 330 has a bore-central axis, $X_{bore}$. The bore-central axis $X_{bore}$ is defined as a straight axis/line that goes through the geometric center and/or the axis of symmetry of at least the interior threaded bore 330 of the zygomatic dental implant 300. The bore-central axis $X_{bore}$ of the interior threaded bore 330 is at an angle θ relative to the main-central axis $X_{main}$ of the zygomatic dental implant 300. The angle θ can be any angle, such as, for example, between about between about 7 degrees and about 65 degrees or between about 40 degrees and about 65 degrees. As shown in FIG. 7C, the angle θ is about 55 degrees.

The main-central axis $X_{main}$ and the bore-central axis $X_{bore}$ intersect at a point, I, (FIG. 7C). As shown, the point, I, is generally located along a plane, P, (FIGS. 7A and 7C) that is defined by the angled portion or platform 314 of the zygomatic dental implant 300. The location of the intersection at point, I, along the plane, P, occurs because of the relative location of the interior threaded bore 330 and the non-rotational feature 350 in the coronal portion 312*a* of the zygomatic dental implant 300. If the interior threaded bore 330 and the non-rotational feature 350 were moved relatively upward or coronally, the intersection point, I, would also move relatively upward or coronally. In some implementations, the intersection, I, of the main-central axis $X_{main}$ with the bore-central axis $X_{bore}$ for the zygomatic dental implant 300 is spaced from the plane, P, by no more than about 0.8 millimeters, no more than about 0.7 millimeters, no more than about 0.6 millimeters, no more than about 0.5 millimeters, no more than about 0.4 millimeters, no more than about 0.3 millimeters, no more than about 0.2 millimeters, no more than about 0.1 millimeters, no more than about 0.05 millimeters, or no more than about 0.025 millimeters. In some implementations, the intersection, I, of the main-central axis $X_{main}$ with the bore-central axis $X_{bore}$ for the zygomatic dental implant 300 is spaced from the plane, P, by between about 0.0 millimeters and about 0.8 millimeters, by between about 0.0 millimeters and about 0.6 millimeters, by between about 0.0 millimeters and about 0.5 millimeters, by between about 0.0 millimeters and about 0.3 millimeters, by between about 0.0 millimeters and about 0.1 millimeters. It is noted that, if the intersection point, I, was moved upward or coronally (not shown) on the zygomatic dental implant 300, to prevent the interior threaded bore 330 of such a modified version of the zygomatic dental implant 300 (not shown) from protruding through the first side 310*a* of the generally cylindrical body 310, the depth of the interior threaded bore 330 would need to be relatively shorter (requiring a relatively shorter screw for any mating components). Alternatively or additionally, the coronal portion 312*a* or head of such a modified version of the zygomatic dental implant 300 can be enlarged (e.g., have at least a portion with a relatively larger outer diameter) to accommodate the relatively higher or more coronal interior threaded bore 330, such as, for example, the coronal portion 512*a* of the zygomatic implant 500 shown in FIGS. 9E and 9F.

In some exemplary implementations, the asymmetrical external feature 320 has an overall length, along the main-central axis, between four millimeters and twenty millimeters. In some implementations, the first portion of the plurality of circumferentially extending grooves 321*a*, which includes the grooves 321 with circumferential lengths that decrease apically, has an overall length, along the main-central axis, between two millimeters and ten millimeters. The second portion of the plurality of circumferentially extending grooves 321*b*, which includes the grooves 321 with circumferential lengths that increase apically, has an overall length, along the main-central axis, between two millimeters and ten millimeters.

In some such implementations, a ratio of the length L (FIG. 7C) of the generally cylindrical body 310 to the length of the asymmetrical external feature 320 is between about two to about eighteen. In some such implementations, a ratio of the length L (FIG. 7C) of the generally cylindrical body 310 to the length of the first portion of the plurality of circumferentially extending grooves 321*a* is between about two to about thirty-five. In some such implementations, a ratio of the length L (FIG. 7C) of the generally cylindrical body 310 to the length of the second portion of the plurality of circumferentially extending grooves 321*b* is between about two to about thirty-five.

The zygomatic dental implant 300 can be referred to as a 4.3 millimeter dental implant, which is the nominal maximum outer diameter of the coronal portion 312*a*. The nominal maximum outer diameter of the middle and apical portions 312*b* and 312*c* is 3.4 millimeters. Various other nominal maximum outer diameters of the coronal portion 312*a* are contemplated for the zygomatic dental implant 300, such as, for example, 3.0, 3.5, 4.0, 4.1, 4.2, 4.3, 4.4, 4.5, 4.6, 4.7, 4.8, 4.9, 5.0, 5.5, 6.0, etc., or any size in-between. Similarly, various other nominal maximum outer diameters of the middle and apical portions 312*b* and 312*c* are contemplated for the zygomatic dental implant 300, such as, for example, 2.0, 2.5, 3.0, 3.1, 3.2, 3.3, 3.4, 3.5, 3.6, 3.7, 3.8, 3.9, 4.0, 4.1, 4.2, 4.3, 4.4, 4.5, etc., or any size in-between.

In some implementations, the coronal portion 312*a* of the generally cylindrical body 310 has a relatively larger maximum outer diameter than the maximum outer diameter of the non-threaded middle portion 312*b* of the generally cylindrical body 310 and the maximum outer diameter of the apical portion 312*c* of the generally cylindrical body 310. Alternatively, in some implementations, the maximum outer diameter of the coronal portion 312*a* of the generally cylindrical body 310 can be the same as, or similar to, the maximum outer diameter of the non-threaded middle portion 312*b* of the generally cylindrical body 310 and the maximum outer diameter of the apical portion 312*c* of the generally cylindrical body 310. In such alternatives, the outer diameter of the entire body 310 can be generally constant (e.g., except for minor variations due to grooves, threads, or the like).

Figure 8A:
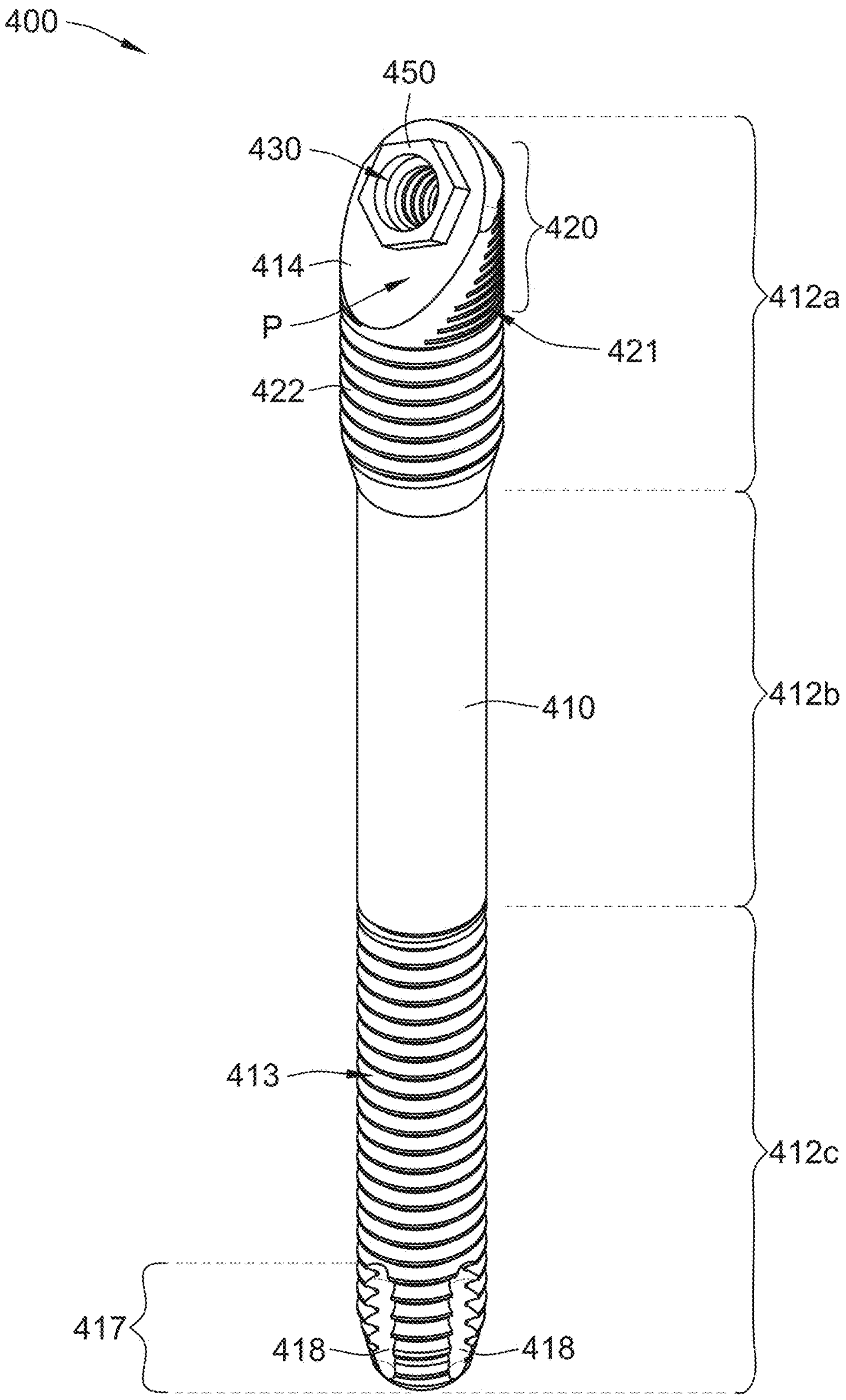
FIG. 8A is a perspective view of a zygomatic dental implant according to some implementations of the present disclosure.
Figure 8B:
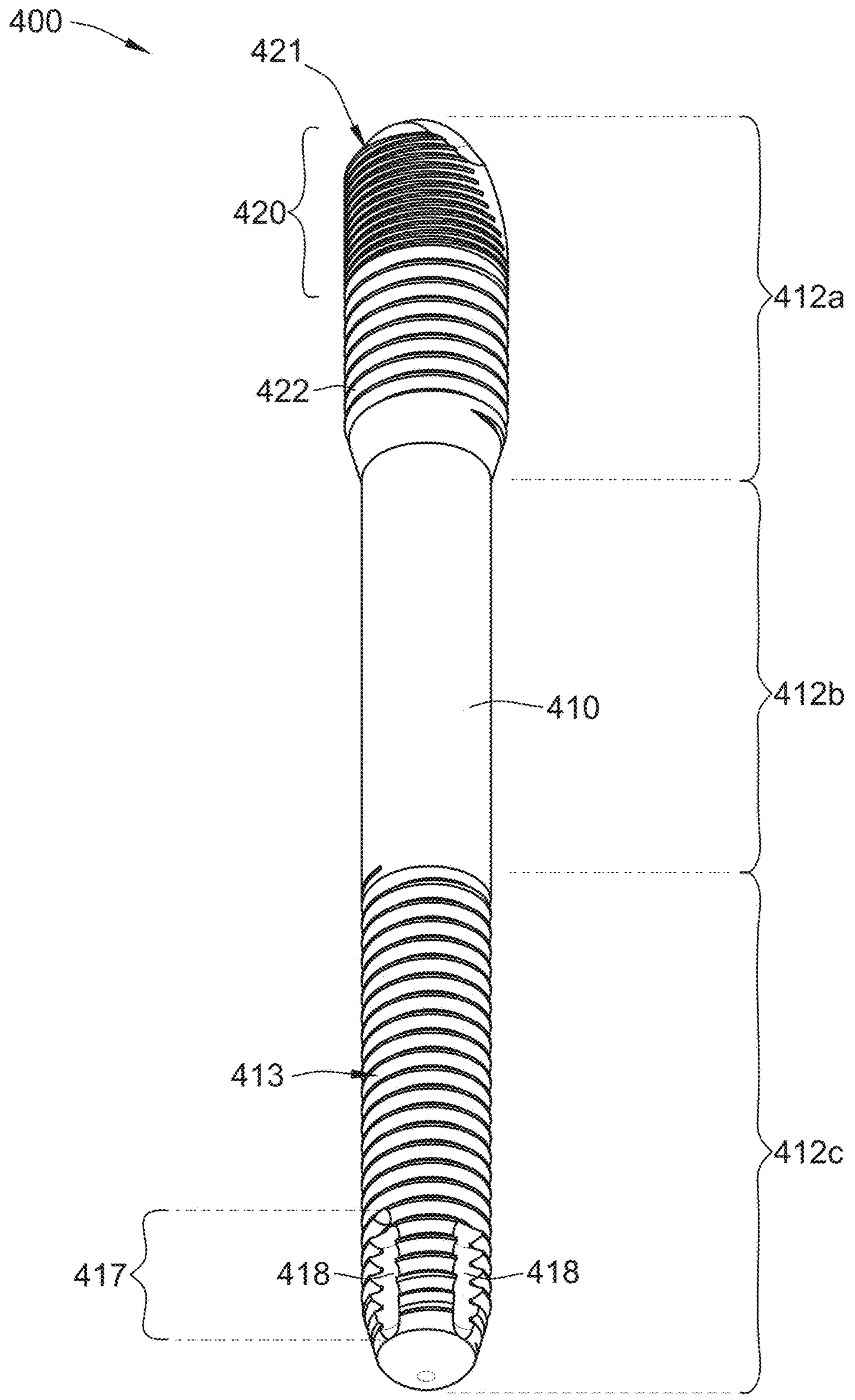
FIG. 8B is another perspective view of the zygomatic dental implant of FIG. 8A.
Figure 8C:
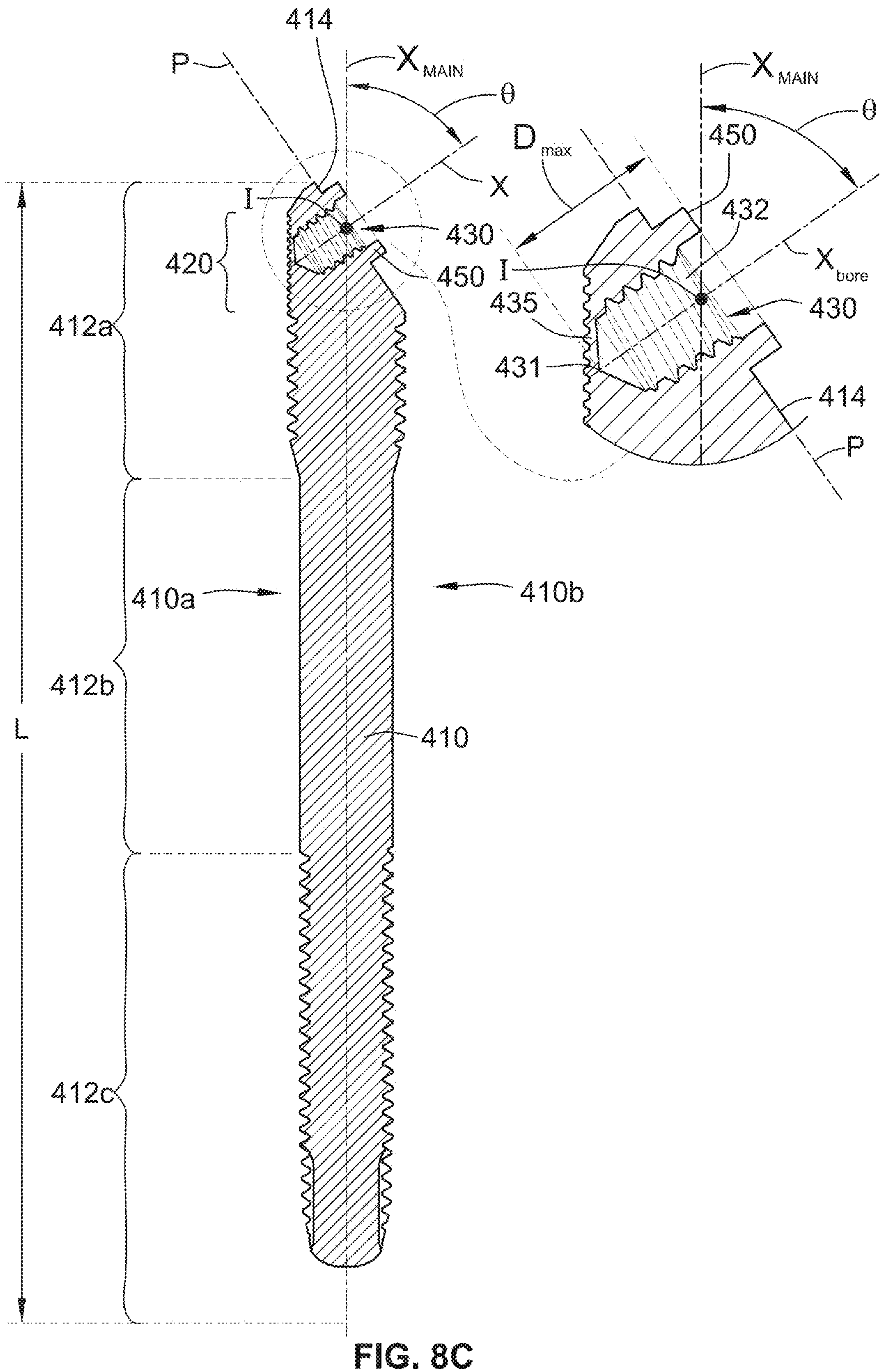
FIG. 8C is a side cross-sectional view of the zygomatic dental implant of FIG. 8A.

Referring generally to FIGS. 8A-8C, a zygomatic dental implant 400 includes a generally cylindrical body 410, an interior threaded bore 430, a non-rotational feature 450, and an asymmetrical external feature 420. The generally cylindrical body 410 has a first side 410*a* and a second opposing side 410*b*. The generally cylindrical body 410 can also be generally divided into a proximal or coronal portion 412*a*, a middle portion 412*b*, and a distal or apical portion 412*c*. The apical portion 412*c* is for anchoring the zygomatic dental implant 400 in zygoma bone of a patient.

The zygomatic dental implant 400 generally differs from other dental implants in that the zygomatic dental implant 400 is significantly longer than non-zygomatic dental implants such that the zygomatic dental implant 400 can be installed into an upper jawbone close to and/or within a zygoma bone in a mouth of a patient in the same, or similar, manner as zygomatic dental implant 100 shown in FIG. 2. The zygomatic dental implant 400 is the same as, or similar to, the zygomatic dental implant 300 in many aspects; however, the zygomatic dental implant 400 mainly differs from the zygomatic dental implant 300 in that the zygomatic dental implant 400 does not include a generally flat feature like the generally flat feature 360 of the zygomatic dental implant 300. As such, the coronal portion 412*a* and the middle portion 412*b* are more cylindrical as compared with the coronal portion 312*a* and the middle portion 312*b*.

As shown in FIGS. 8A-8C, the zygomatic dental implant 400 includes a non-threaded middle portion 412*b* of the generally cylindrical body 410, which is positioned between the coronal portion 412*a* and the apical portion 412*c* of the generally cylindrical body 410. Alternatively, all of, or a portion of, the non-threaded middle portion 412*b* can include one or more threads, grooves, projections, or any combination thereof.

The coronal portion 412*a* includes the asymmetrical external feature 420 about an exterior surface thereof that includes a plurality of circumferentially extending grooves 421. The asymmetrical external feature 420 and the plurality of circumferentially extending grooves 421 are the same as, or similar to, the asymmetrical external feature 320 and the plurality of circumferentially extending grooves 321 of the zygomatic dental implant 300 described above except that the asymmetrical external feature 420 does not include a plurality of circumferentially extending grooves that decreases apically like the first plurality of circumferentially extending grooves 321*a*. Rather, adjacent to the plurality of circumferentially extending grooves 421 in the apical direction is a thread 422 that is wrapped around the body 410 of the zygomatic dental implant 400. In some implementations, the thread 422 aids in securing the zygomatic dental implant 400 to alveolar bone during installation, if such bone is present in the patient in the appropriate region of the mouth of the patient.

Like the zygomatic dental implant 300, the zygomatic dental implant 400 does not include a non-grooved area like the non-grooved area 125 of the zygomatic dental implant 100 because, for example, the zygomatic dental implant 400 has a relatively larger diameter than the zygomatic dental implant 100 such that a bottom 431 (FIG. 8C) of the interior threaded bore 430 is spaced sufficiently from the exterior surface of the first side 410*a* of the zygomatic dental implant 400. Put another way, a circumferentially extending wall 435 (FIG. 8C) formed by the interior threaded bore 430, which is the same as, or similar to, the circumferentially extending wall 135, has a minimum thickness that is sufficient to permit the plurality of circumferentially extending grooves 421 to extend along the first side 410*a* and adjacent to the bottom of the interior threaded bore 430 without being prone to easily break/snap/fail.

Figure 9C:
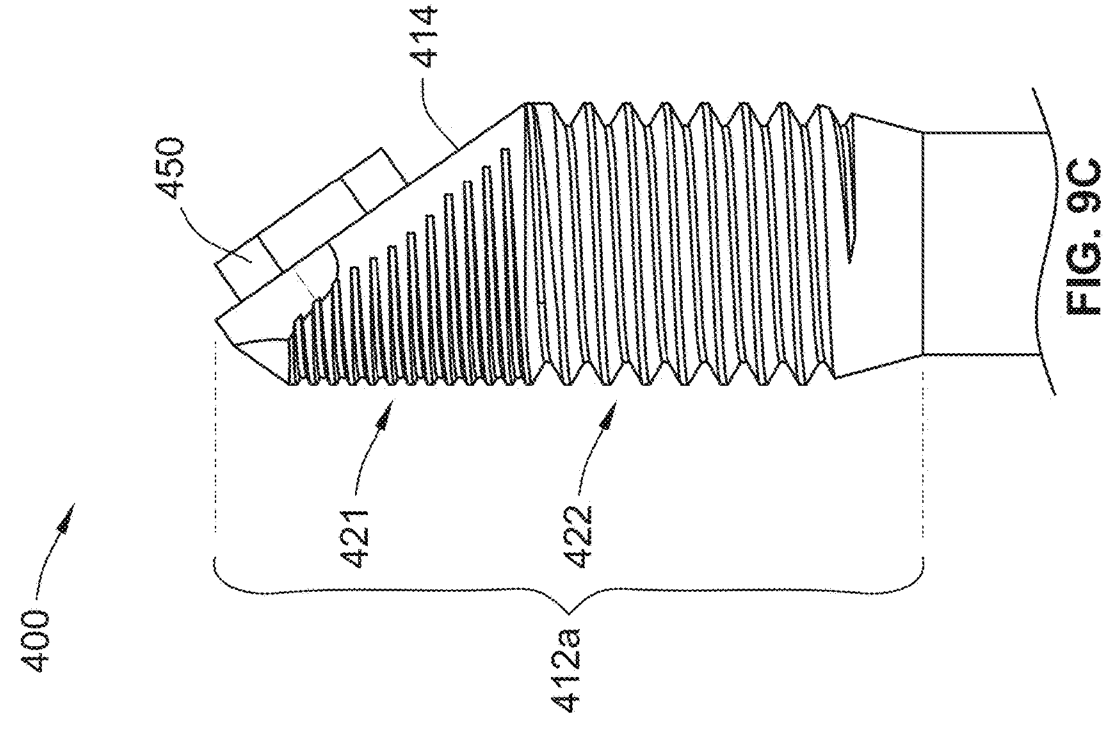
FIG. 9C illustrates a side elevation view of an upper portion of the zygomatic dental implant of FIG. 8A.

In some implementations, a circumferential length of each of the plurality of circumferentially extending grooves 421 is the same, different, or a combination thereof. For example, as best shown in FIGS. 8B and 9C, the circumferential length of the plurality of circumferentially extending grooves 421 increases apically in the same, or similar, fashion as the second portion of the plurality of circumferentially extending grooves 321*b*. In other words, the ends of the plurality of circumferentially extending grooves 421 taper outwardly in an apical direction.

The apical portion 412*c* includes external threads 413 about an exterior surface thereof which are the same as, or similar to, the external threads 113 of the zygomatic dental implant 100. The apical portion 412*c* of the generally cylindrical body 410 includes one row 417 of a plurality of generally vertical flutes 418 spaced about the circumference of the zygomatic dental implant 400 that cross (e.g., break up) the apical external thread 413. The flutes 418 aid the installation of the zygomatic dental implant 400 by (i) self-tapping the zygomatic dental implant 400 into the patient's bone socket and/or (ii) providing a path for material to be ejected from the cavity (e.g., bone socket) receiving the zygomatic dental implant 400 during installation. More or fewer flutes 418 in the single row and/or in one or more additional rows (e.g., as discussed above in connection with the two rows of flutes 118 in the zygomatic dental implant 100) are also contemplated.

The interior threaded bore 430 is formed in the coronal portion 412*a* of the zygomatic dental implant 400, which is the same as, or similar to, the interior threaded bore 330 of the zygomatic dental implant 300 described above. The interior threaded bore 430 includes a female or internal thread 432 therein to threadingly mate with a second screw 602*b* (shown in FIGS. 10C and 10D) to hold an abutment (not shown) and/or a second fixture 601*b* (shown in FIGS. 10C and 10D and described below) on the zygomatic dental implant 400. The interior threaded bore 430 has a maximum depth $D_{MAX}$ that is the same as, or similar to, the maximum depth $D_{MAX}$ of the interior threaded bore 330.

The non-rotational feature 450 generally protrudes from the coronal portion 412*a* and is external to the interior threaded bore 430 and is the same as, or similar to, the non-rotational feature 350 of the zygomatic dental implant 300 described above.

The generally cylindrical body 410 of the zygomatic dental implant 400 has a main-central axis $X_{main}$ (FIG. 8C). The main-central axis $X_{main}$ is defined as a straight axis/line that goes through the geometric center and/or the axis of symmetry of at least the apical portion 412*c* and the middle portion 412*b* of the generally cylindrical body 410 of the zygomatic dental implant 400. However, the main-central axis $X_{main}$ of the zygomatic dental implant 400 does not go through (e.g., is not coincident with) the axis of symmetry of the coronal portion 412*a* of the generally cylindrical body 410. This is because the coronal portion 412*a* of the generally cylindrical body 410 of the zygomatic dental implant 400 includes an angled portion 414 (best shown in FIG. 8A) that is angled and/or offset relative to (1) the main-central axis $X_{main}$ of the zygomatic dental implant 400 and (2) the rest of the generally cylindrical body 410 of the zygomatic dental implant 400. The angled portion 414 is generally referred to as a platform of the zygomatic dental implant 400. The angled portion 414 is the same as, or similar to, the angled portion 314 of the zygomatic dental implant 300 except that the angled portion 414 is relatively larger (e.g., includes more surface area for a same nominally sized zygomatic dental implant) at least because the zygomatic dental implant 400 does not include a generally flat feature that removes a portion of the angled portion 314 of the zygomatic dental implant 300 as compared with the angled portion 414 of the zygomatic dental implant 400. A comparison of the platform 314 and the platform 414 can best be seen by comparing FIG. 7A with FIG. 8A. In some implementations, the relatively larger platform 414 allows for relatively larger components to mate with/abut the platform 414 as compared with the platform 314.

As best shown in FIG. 8C, the interior bore 830 has a bore-central axis, $X_{bore}$. The bore-central axis $X_{bore}$ is defined as a straight axis/line that goes through the geometric center and/or the axis of symmetry of at least the interior threaded bore 430 of the zygomatic dental implant 400. The bore-central axis $X_{bore}$ of the interior threaded bore 430 is at an angle θ relative to the main-central axis $X_{main}$ of the zygomatic dental implant 400. The angle θ can be any angle, such as, for example, between about between about 7 degrees and about 65 degrees or between about 40 degrees and about 65 degrees. As shown in FIG. 8C, the angle θ is about 55 degrees.

Like the axes in the zygomatic dental implant 300, the main-central axis $X_{main}$ and the bore-central axis $X_{bore}$ intersect at a point, I, (FIG. 8C) located along a plane, P, (FIGS. 8A and 8C) that is defined by the angled portion or platform 414 of the zygomatic dental implant 400. In some implementations, the intersection, I, of the main-central axis $X_{main}$ with the bore-central axis $X_{bore}$ for the zygomatic dental implant 400 is spaced from the plane, P, by no more than about 0.8 millimeters, no more than about 0.7 millimeters, no more than about 0.6 millimeters, no more than about 0.5 millimeters, no more than about 0.4 millimeters, no more than about 0.3 millimeters, no more than about 0.2 millimeters, no more than about 0.1 millimeters, no more than about 0.05 millimeters, or no more than about 0.025 millimeters. In some implementations, the intersection, I, of the main-central axis $X_{main}$ with the bore-central axis $X_{bore}$ for the zygomatic dental implant 400 is spaced from the plane, P, by between about 0.0 millimeters and about 0.8 millimeters, by between about 0.0 millimeters and about 0.6 millimeters, by between about 0.0 millimeters and about 0.5 millimeters, by between about 0.0 millimeters and about 0.3 millimeters, by between about 0.0 millimeters and about 0.1 millimeters.

In some exemplary implementations, the asymmetrical external feature 420 has an overall length, along the main-central axis, between two millimeters and ten millimeters. In some implementations, the plurality of circumferentially extending grooves 421 has an overall length, along the main-central axis, between two millimeters and ten millimeters. In some implementations, the thread 422 has an overall length, along the main-central axis, between three millimeters and fourteen millimeters.

The zygomatic dental implant 400 can be referred to as a 4.3 millimeter dental implant, which is the nominal maximum outer diameter of the coronal portion 412*a*. The nominal maximum outer diameter of the middle and apical portions 412*b* and 412*c* is 3.4 millimeters. Various other nominal maximum outer diameters of the coronal portion 412*a* are contemplated for the zygomatic dental implant 400, such as, for example, 3.0, 3.5, 4.0, 4.1, 4.2, 4.3, 4.4, 4.5, 4.6, 4.7, 4.8, 4.9, 5.0, 5.5, 6.0, etc., or any size in-between. Similarly, various other nominal maximum outer diameters of the middle and apical portions 412*b* and 412*c* are contemplated for the zygomatic dental implant 400, such as, for example, 2.0, 2.5, 3.0, 3.1, 3.2, 3.3, 3.4, 3.5, 3.6, 3.7, 3.8, 3.9, 4.0, 4.1, 4.2, 4.3, 4.4, 4.5, etc., or any size in-between.

In some implementations, the coronal portion 412*a* of the generally cylindrical body 410 has a relatively larger maximum outer diameter than the maximum outer diameter of the non-threaded middle portion 412*b* of the generally cylindrical body 410 and the maximum outer diameter of the apical portion 412*c* of the generally cylindrical body 410. Alternatively, in some implementations, the maximum outer diameter of the coronal portion 412*a* of the generally cylindrical body 410 can be the same as, or similar to, the maximum outer diameter of the non-threaded middle portion 412*b* of the generally cylindrical body 10 and the maximum outer diameter of the apical portion 412*c* of the generally cylindrical body 410. In such alternatives, the outer diameter of the entire body 410 can be generally constant (e.g., except for minor variations due to grooves, threads, or the like).

Referring to FIGS. 9A-9F, the coronal portion 312*a* of the zygomatic dental implant 300 (FIGS. 9A and 9B), the coronal portion 412*a* of the zygomatic dental implant 400 (FIGS. 9C and 9D), and the coronal portion 512*a* of the zygomatic dental implant 500 (FIGS. 9E and 9E) are shown for comparing intersections of main-central axes $X_{main}$ with the bore-central axes $X_{bore}$. As discussed above, the intersection occurs for the zygomatic dental implants 300, 400 at point I, which is on plane P that is defined by the angled portion 314, 414. However, the intersection, I, of the main-central axis $X_{main}$ with the bore-central axis $X_{bore}$ for the zygomatic dental implant 500 occurs below an angled portion or platform 514 of the zygomatic dental implant 500. In some implementations, the intersection, I, of the main-central axis $X_{main}$ with the bore-central axis $X_{bore}$ for the zygomatic dental implant 500 is spaced from the plane, P, by about 1.3 millimeters. As such, the maximum depth $D_{MAX}$ of an interior threaded bore 530 of the zygomatic dental implant 500 is relatively longer than the maximum depth $D_{MAX}$ of the interior bores 330, 430 of the zygomatic dental implants 300, 400. This makes sense, because as an interior bore of a zygomatic dental implant is moved downward/apically (e.g., in a hypothetical design of a zygomatic dental implant), there is more material in the implant body to accommodate a relatively deeper interior bore (e.g., there is more space widthwise as the entrance to the interior bore/non-rotational feature is slid down/apically the angled portion/platform). Further, as the interior bore is moved downward/apically, the intersection, I, of the main-central axis $X_{main}$ with the bore-central axis $X_{bore}$ also moves downward. While the relatively deeper interior threaded bore 530 can be beneficial (e.g., able to receive longer screws), the relatively larger head or coronal portion 512*a* can have some drawbacks as is illustrated by FIGS. 10A-10F.

Referring generally to FIG. 10A-10F, various fixtures 601*a*, 610*b*, 601*c* attached to zygomatic dental implants 300, 400, 500 are shown for comparison. Namely, it is shown that the zygomatic dental implants 300, 400 that have main-central axes $X_{main}$ that intersect bore-central axes $X_{bore}$ relatively higher/more coronally (e.g., on the plane P defined by the platform 314, 414), permit a relatively narrower fixture (e.g., fixtures 601*a*, 610*b*) and/or a fixture with a maximum outer diameter that is equal to or less than a maximum outer diameter of the zygomatic dental implant. That is because, as the non-rotational feature and internal bore are moved upward/coronally (which can result in the main-central axis $X_{main}$ intersecting the bore-central axis $X_{bore}$ on or near plane, P), a relatively smaller diameter fixture can be used to engage about the circumference of the non-rotational feature and be coupled to the zygomatic dental implant via a screw.

Figures 10A, 10B, 10C, 10D, 10E, 10F:
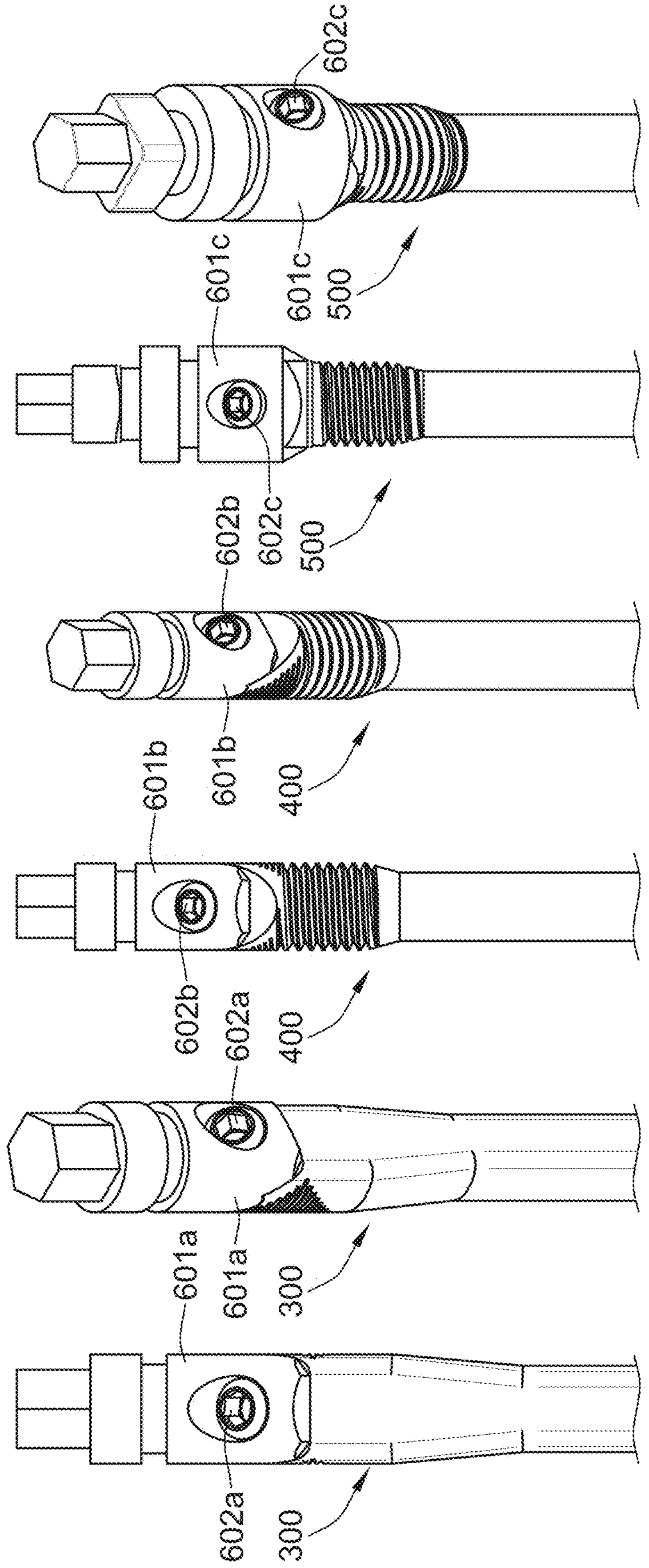
FIG. 10A illustrates a side cross-sectional view of an upper portion of the zygomatic dental implant of FIG. 7A coupled with a first fixture according to some implementations of the present disclosure.
FIG. 10B illustrates a perspective view of the upper portion of the zygomatic dental implant of FIG. 10A coupled with the first fixture.
FIG. 10C illustrates a side cross-sectional view of an upper portion of the zygomatic dental implant of FIG. 8A coupled with a second fixture according to some implementations of the present disclosure.
FIG. 10D illustrates a perspective view of the upper portion of the zygomatic dental implant of FIG. 10C coupled with the second fixture.
FIG. 10E illustrates a side cross-sectional view of an upper portion of the zygomatic dental implant of FIG. 9E coupled with a third fixture according to some implementations of the present disclosure.
FIG. 10F illustrates a perspective view of the upper portion of the zygomatic dental implant of FIG. 10E coupled with the third fixture.

FIGS. 10A and 10B show the coronal portion 312*a* of the zygomatic dental implant 300 coupled to the first fixture 601*a* via the first screw 602*a*. FIGS. 10C and 10D show the coronal portion 412*a* of the zygomatic dental implant 400 coupled to the second fixture 601*b* via the second screw 602*b*. As discussed above, the main-central axis $X_{main}$ intersects with the bore-central axis $X_{bore}$ for both of the zygomatic dental implants 300, 400 at point I on plane P defined by the platform 314, 414 (FIGS. 7C, 8C, 9B, and 9D). This geometry permits the fixtures 601*a*, 601*b* to be securely attached via the screws 602*a*, 602*b* to the zygomatic dental implant 300, 400, respectively, and have a maximum outer diameter that is about the same as, e.g., corresponds to, a maximum outer diameter of the zygomatic dental implant 300, 400 and/or a maximum outer diameter of the coronal portion 312*a*, 412*a* of the zygomatic dental implant 300, 400.

Figure 9F:
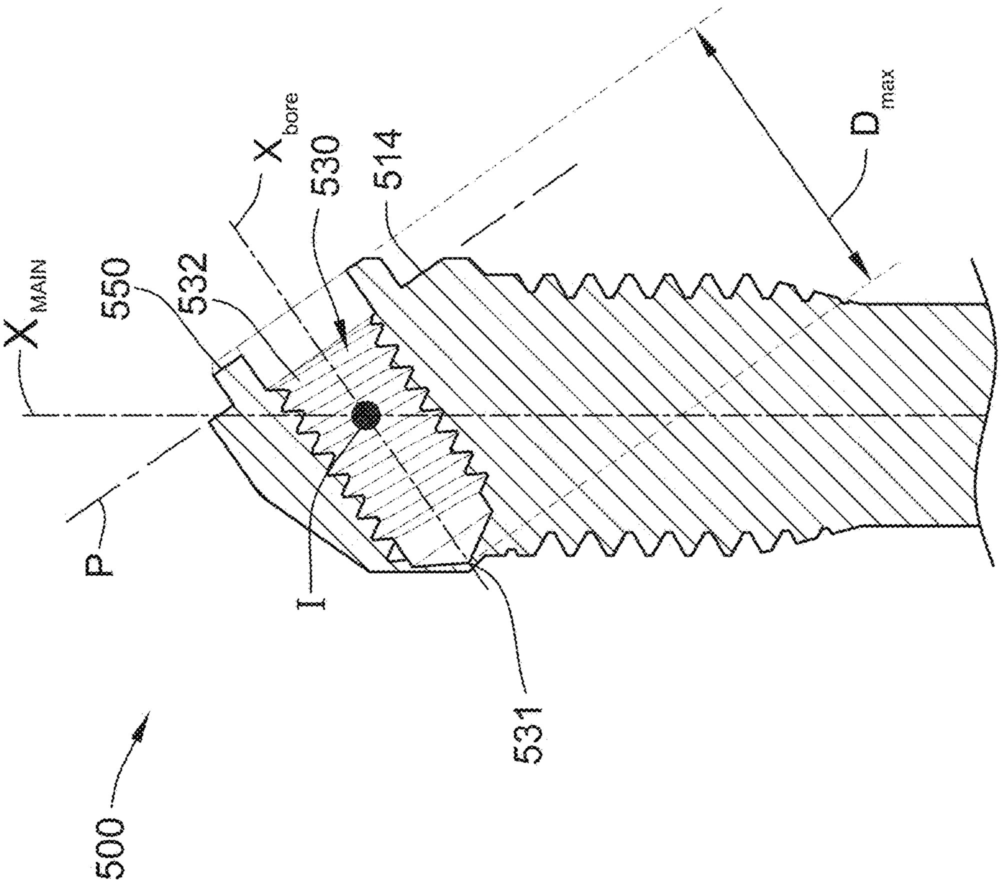
FIG. 9F illustrates a side cross-section view of the upper portion of the zygomatic dental implant of FIG. 9E.
Figure 9E:
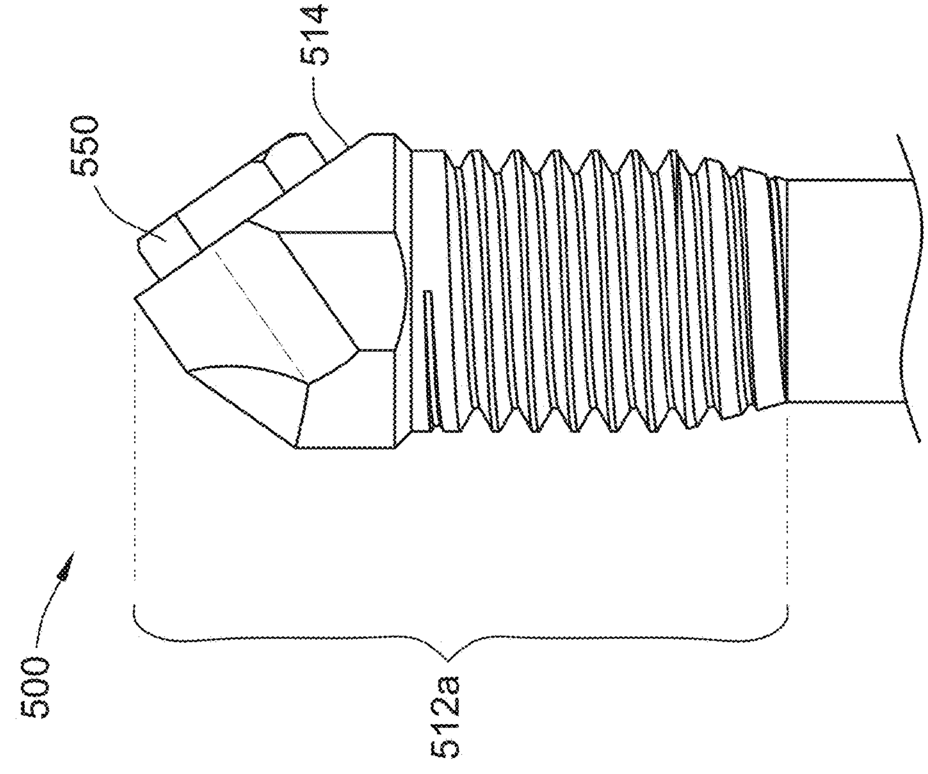
FIG. 9E illustrates a side elevation view of an upper portion of a zygomatic dental implant having a main central axis and a threaded bore central axis that intersect below a platform of the zygomatic dental implant according to some implementations of the present disclosure.

By way of comparison, FIGS. 10E and 10F show the coronal portion 512*a* of the zygomatic dental implant 500 coupled to the third fixture 601*c* via a third screw 602*c*. As best shown in FIG. 9F and discussed above, the main-central axis $X_{main}$ intersects with the bore-central axis $X_{bore}$ for the zygomatic dental implant 500 at point, I, that is generally below and offset from plane P defined by the platform 514 (shown in FIG. 9F). For such geometry to be securely attached via the third screw 602*c* to the zygomatic dental implant 500, the third fixture 601*c* requires a maximum outer diameter that is larger than a maximum outer diameter of the zygomatic dental implant 500, as shown in FIGS. 10E and 10F.

A benefit of having a fixture that has a maximum outer diameter that is the same as, or less than, the maximum outer diameter of the zygomatic dental implant (e.g., such as the first and second fixtures 601*a,b* when coupled with the zygomatic dental implants 300, 400, respectively), is that such a fixture can be used to install/drive a zygomatic dental implant into a bone socket without risk of the fixture hitting surrounding tissue and/or bone and potentially inhibiting the installation process as exists when the fixture has an outer diameter that is greater than the maximum outer diameter of the zygomatic dental implant.

Anatomy of the zygoma indicates that the zygomatic dental implants 100, 300, 400 have a length L between about 20 millimeters and about 70 millimeters, more specifically, zygoma anatomy can indicate the zygomatic dental implants 100, 300, 400 have a length L between about 30 millimeters and about 60 millimeters. In some implementations, zygomatic indicates the zygomatic dental implants 100, 300, 400 have a length of about 25 millimeters, about 30 millimeters, about 35 millimeters, about 40 millimeters, about 45 millimeters, about 50 millimeters, about 55 millimeters, about 60 millimeters, about 65 millimeters, about 70 millimeters. Such a length L of the zygomatic dental implants 100, 300, 400 is significantly longer than non-zygomatic dental implants, which typically have a length between about 6 millimeters and about 18 millimeters, more specifically, non-zygomatic dental implants have a length between about 8 millimeters and about 15 millimeters.

Each of the non-threaded middle portions 112*b*, 312*b*, 412*b* has a length that is between about 20 percent and about 70 percent of a total length of the zygomatic dental implant 100, 300, 400, respectively. More preferably, each of the non-threaded middle portions 112*b*, 312*b*, 412*b* has a length that is between about 35 percent and about 55 percent of a total length of the zygomatic dental implant 100, 300, 400, respectively. In some implementations, each of the non-threaded middle portions 112*b*, 312*b*, 412*b* has a length that is about 45 percent of a total length of the zygomatic dental implant 100, 300, 400, respectively.

While the present disclosure has been described with reference to one or more particular embodiments and implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A zygomatic dental implant, comprising:

a generally cylindrical body having a coronal portion, an apical portion, and a middle portion between the apical portion and the coronal portion, the generally cylindrical body having a main-central axis, the apical portion including threads for anchoring the zygomatic dental implant in zygoma bone of a patient, the coronal portion including a platform surface;

an interior threaded bore formed in the coronal portion below the platform surface for receiving a screw configured to removably hold an abutment in engagement with the zygomatic dental implant;

a generally flat feature formed in the coronal portion and configured to engage soft tissue of the patient, the generally flat feature located below the platform surface and extending downwardly toward the apical portion, the generally flat feature having a width that varies along a length of the generally flat feature as measured along the main-central axis; and a plurality of grooves located below the platform surface in the coronal portion configured to engage alveolar bone of the patient, the plurality of grooves being located on an opposite side of the coronal portion as the generally flat feature.

2. The zygomatic dental implant of claim 1, wherein the generally flat feature and the platform surface intersect.

3. The zygomatic dental implant of claim 1, wherein the generally flat feature is parallel with the main-central axis of the generally cylindrical body.

4. The zygomatic dental implant of claim 1, wherein the generally flat feature extends outside of the coronal portion into the middle portion of the zygomatic dental implant.

5. The zygomatic dental implant of claim 4, wherein a length of the generally flat feature as measured along the main-central axis is between about 50 percent and about 75 percent of a length of the zygomatic dental implant.

6. The zygomatic dental implant of claim 1, wherein the width of the generally flat feature varies at an end region of the flat feature.

7. The zygomatic dental implant of claim 6, wherein the end region of the generally flat feature has a rounded scalloped shape.

8. The zygomatic dental implant of claim 1, wherein the middle portion is threadless.

9. The zygomatic dental implant of claim 1, wherein the plurality of grooves are circumferentially spaced away from the generally flat feature.

10. A zygomatic dental implant comprising:

a generally cylindrical body having a coronal portion, an apical portion, and a middle portion between the apical portion and the coronal portion, the apical portion configured for anchoring the zygomatic dental implant in zygoma bone of a patient, the generally cylindrical body having a main-central axis, the coronal portion including a platform;

a generally flat feature located at least in the coronal portion and configured to engage soft tissue of the patient, a length of the generally flat feature, as measured along the main-central axis, is between about 50 percent and about 75 percent of a length of the zygomatic dental implant;

an interior threaded bore formed in the coronal portion below the platform of the generally cylindrical body for receiving a screw configured to removably hold an abutment in engagement with the zygomatic dental implant; and a plurality of grooves on the coronal portion of the generally cylindrical body configured to engage alveolar bone of the patient, the plurality of grooves being located on an opposite side of the coronal portion from the generally flat feature.

11. The zygomatic dental implant of claim 10, further including a non-rotational feature extending from the platform.

12. The zygomatic dental implant of claim 10, wherein the generally flat feature and the platform intersect.

13. The zygomatic dental implant of claim 10, wherein the generally flat feature has a width that varies along the length of the flat feature.

14. The zygomatic dental implant of claim 13, wherein the width of the generally flat feature varies at an end region of the flat feature.

15. The zygomatic dental implant of claim 14, wherein the end region of the generally flat feature has a rounded scalloped shape.

16. The zygomatic dental implant of claim 10, wherein the bore has a bore axis that is angled relative to the main-central axis.

17. The zygomatic dental implant of claim 10, wherein the plurality of grooves are circumferentially spaced away from the generally flat feature.

18. A zygomatic dental implant comprising:

a generally cylindrical body having a coronal portion, an apical portion, and a middle portion between the apical portion and the coronal portion, the generally cylindrical body having a main-central axis, the apical portion including threads for anchoring the zygomatic dental implant in zygoma bone of a patient, the coronal portion including a platform surface;

an interior threaded bore formed in the coronal portion below the platform surface for receiving a screw configured to removably hold an abutment in engagement with the zygomatic dental implant;

a generally flat feature formed in the coronal portion and configured to engage soft tissue of the patient, the generally flat feature located below the platform surface and extending downwardly into the middle portion of the generally cylindrical body, the generally flat feature having a width that varies along a length of the generally flat feature as measured along the main-central axis, the length of the generally flat feature being between about 50 percent and about 75 percent of a length of the zygomatic dental implant.

19. The zygomatic dental implant of claim 18, further including a plurality of grooves in the coronal portion and located below the platform surface, the plurality of grooves being located on the opposite side of the coronal portion as the generally flat feature.

20. The zygomatic dental implant of claim 18, wherein the width of the generally flat feature varies at an end region of the generally flat feature.

21. The zygomatic dental implant of claim 20, wherein the width of the generally flat feature also varies within the coronal portion.

22. The zygomatic dental implant of claim 20, wherein the end region of the flat feature has a rounded scalloped shape.

23. The zygomatic dental implant of claim 18, further including a non-rotational feature extending from the platform.

24. The zygomatic dental implant of claim 18, further including a plurality of grooves in the coronal portion that extend around only a portion of the coronal portion.

25. The zygomatic dental implant of claim 24, wherein the plurality of grooves in the coronal portion includes grooves having different circumferential lengths.

26. The zygomatic dental implant of claim 24, wherein the plurality of grooves are located on the opposite side of the coronal portion as the generally flat feature.

27. The zygomatic dental implant of claim 24, wherein the plurality of grooves are circumferentially spaced away from the generally flat feature.

28. The zygomatic dental implant of claim 18, wherein the bore has a bore axis that is angled relative to the main-central axis.

* * * * *